(12) United States Patent
Nakahara et al.

(10) Patent No.: US 9,800,844 B2
(45) Date of Patent: Oct. 24, 2017

(54) IMAGE PROJECTION APPARATUS

(71) Applicant: MITSUBISHI ELECTRIC CORPORATION, Tokyo (JP)

(72) Inventors: Hironori Nakahara, Tokyo (JP); Tomo Kishigami, Tokyo (JP); Toshiya Matozaki, Tokyo (JP); Nobuo Takeshita, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 93 days.

(21) Appl. No.: 14/915,017

(22) PCT Filed: Apr. 18, 2014

(86) PCT No.: PCT/JP2014/061003
§ 371 (c)(1),
(2) Date: Feb. 26, 2016

(87) PCT Pub. No.: WO2015/029493
PCT Pub. Date: Mar. 5, 2015

(65) Prior Publication Data
US 2016/0212394 A1 Jul. 21, 2016

(30) Foreign Application Priority Data

Aug. 28, 2013 (JP) .................................. 2013-177101

(51) Int. Cl.
*H04N 9/31* (2006.01)
*H04N 5/74* (2006.01)
(Continued)

(52) U.S. Cl.
CPC ....... *H04N 9/3135* (2013.01); *G02B 26/0833* (2013.01); *G02B 26/101* (2013.01);
(Continued)

(58) Field of Classification Search
CPC .. H04N 9/3135; H04N 9/3129; H04N 9/3147; H04N 9/3155; H04N 9/3161;
(Continued)

(56) References Cited

U.S. PATENT DOCUMENTS 5,245,181 A 9/1993 Cho
5,930,019 A 7/1999 Suzuki et al.
(Continued)

FOREIGN PATENT DOCUMENTS

JP 3-144489 A 6/1991
JP 5-2142 A 1/1993
(Continued)

*Primary Examiner* — Sherrie Hsia
(74) *Attorney, Agent, or Firm* — Birch, Stewart, Kolasch & Birch, LLP

(57) ABSTRACT

An image projection apparatus (1) joins a plurality of display images displayed by scanning a plurality of light beams, as if there is no seam between them, thereby displaying a large-sized high-quality image. The image projection apparatus (1) includes a MEMS mirror device (11), a MEMS mirror control unit (13), and a laser beam detector (19). The MEMS mirror control unit (13) makes the laser beam detector (19) irradiated with a first light beam (L1), and at this time adjusts a position of a first display image (18*a*) on the basis of a difference between a detection signal output from a first light sensor (191) and a detection signal output from a second light sensor (192); the MEMS mirror control unit (13) makes a first light reception surface and a second light reception surface irradiated with a second light beam (L2), and at this time adjusts a position of a second display image (18*b*) on the basis of a difference between a detection signal output from the first light sensor (191) and a detection signal output from the second light sensor (192).

12 Claims, 17 Drawing Sheets

(51) Int. Cl.
*H04N 1/113* (2006.01)
*G02B 26/08* (2006.01)
*G02B 26/10* (2006.01)

(52) U.S. Cl.
CPC .............. *H04N 1/113* (2013.01); *H04N 5/74* (2013.01); *H04N 9/3129* (2013.01); *H04N 9/3147* (2013.01); *H04N 9/3155* (2013.01); *H04N 9/3161* (2013.01); *H04N 9/3164* (2013.01)

(58) Field of Classification Search
CPC ........ H04N 9/3164; H04N 5/74; H04N 1/113; G02B 26/0833; G02B 26/101; G02B 26/123
USPC ....... 348/739, 744, 195, 792, 793, 795, 800, 348/804; 353/28, 30, 94
IPC .................................................. H04N 9/31,5/74
See application file for complete search history.

(56) References Cited

U.S. PATENT DOCUMENTS

| | | |
|---|---|---|
| 6,288,818 B1 | 9/2001 | Yoshimaru |
| 6,362,912 B1 | 3/2002 | Lewis et al. |
| 7,401,928 B2 | 7/2008 | Yamamoto et al. |
| 7,605,775 B2 | 10/2009 | Kobayashi et al. |
| 8,085,262 B2 | 12/2011 | Kobayashi et al. |
| 8,416,501 B2 | 4/2013 | Nakanishi |
| 8,511,838 B2 * | 8/2013 | Rothaar ............. G03B 21/2033 353/30 |
| 2001/0024326 A1 | 9/2001 | Nakamura et al. |
| 2009/0189923 A1 * | 7/2009 | Hirano ..................... H04N 5/74 348/744 |
| 2011/0141538 A1 | 6/2011 | Mizumoto |

FOREIGN PATENT DOCUMENTS

| | | |
|---|---|---|
| JP | 6-208066 A | 7/1994 |
| JP | 8-204920 A | 8/1996 |
| JP | 10-213763 A | 8/1998 |
| JP | 2000-180748 A | 6/2000 |
| JP | 2000-235155 A | 8/2000 |
| JP | 2000-267027 A | 9/2000 |
| JP | 2001-265275 A | 9/2001 |
| JP | 2001-281571 A | 10/2001 |
| JP | 2002-333587 A | 11/2002 |
| JP | 2003-266773 A | 9/2003 |
| JP | 2004-527793 A | 9/2004 |
| JP | 2005-77431 A | 3/2005 |
| JP | 2005-351990 A | 12/2005 |
| JP | 2006-126393 A | 5/2006 |
| JP | 2006-178033 A | 7/2006 |
| JP | 2009-180753 A | 8/2009 |
| JP | 2010-44170 A | 2/2010 |
| JP | 2010-79198 A | 4/2010 |
| JP | 2011-154324 A | 8/2011 |
| WO | WO 2010/021216 A1 | 2/2010 |

* cited by examiner

HORIZONTAL DRIVE SIGNAL

1/2 PERIOD OF HORIZONTAL DRIVE SIGNAL

LASER EMISSION TIME

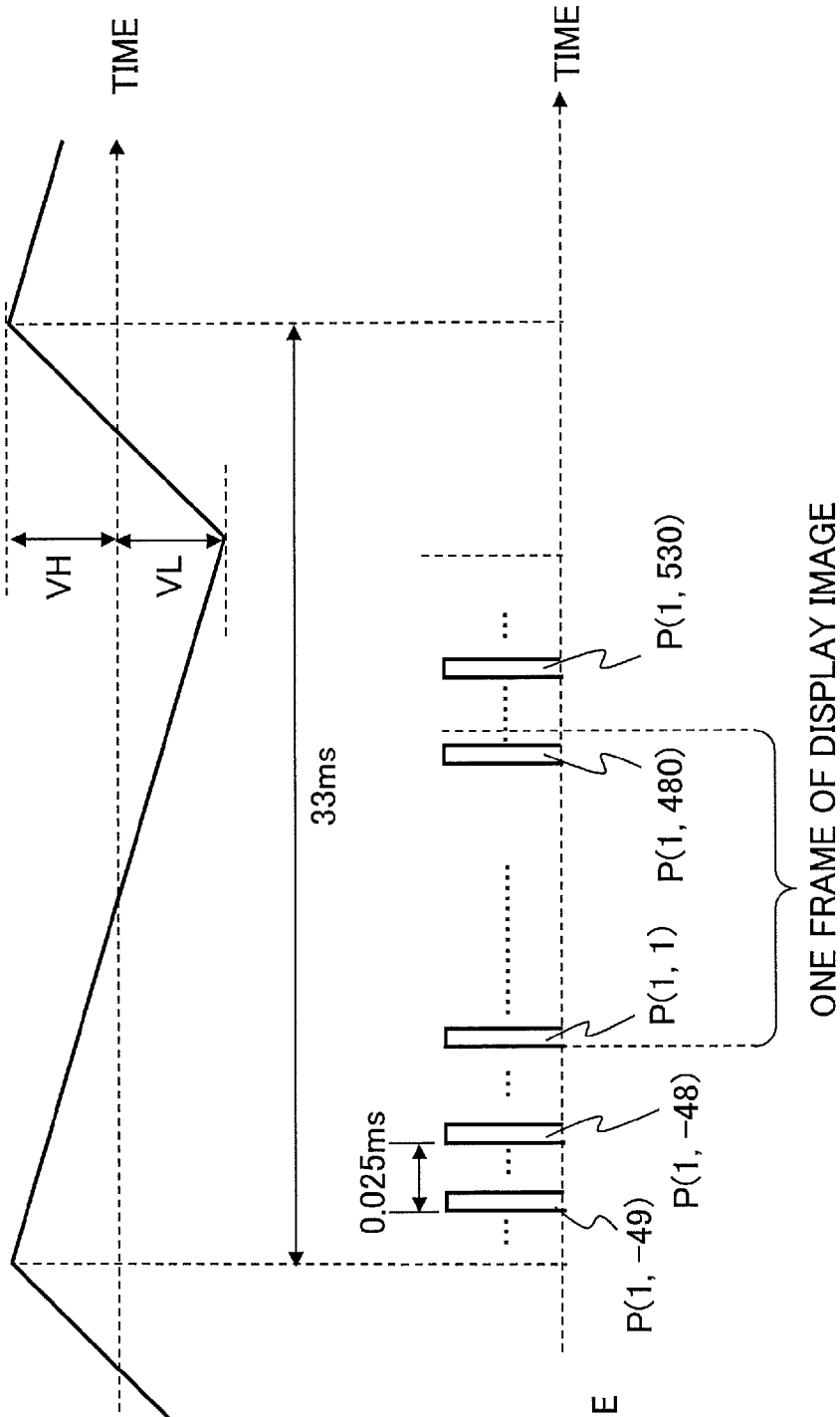

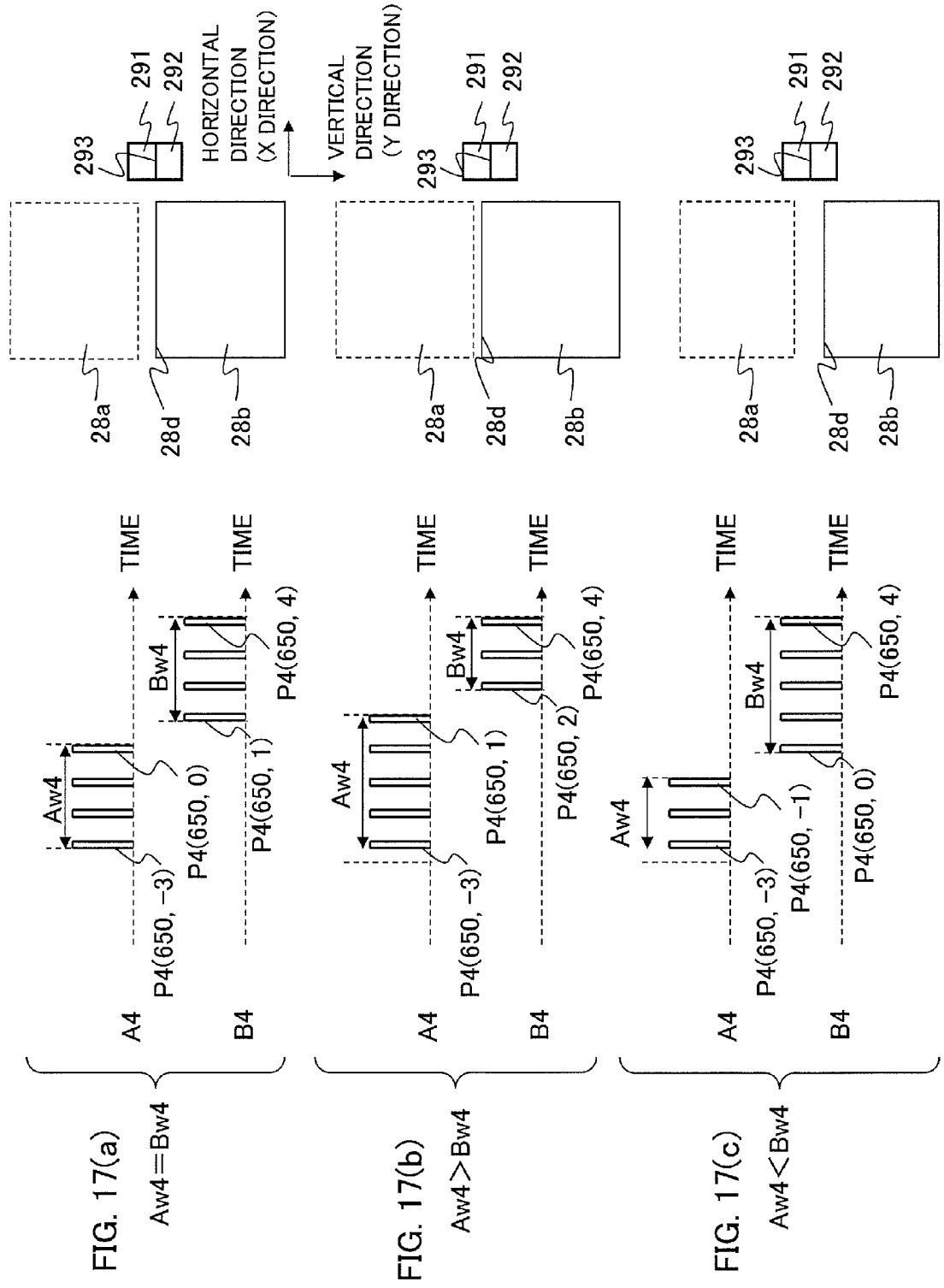

IMAGE PROJECTION APPARATUS

TECHNICAL FIELD

The present invention relates to an image projection apparatus that projects an image on an image display screen by raster-scanning a plurality of light beams by a scan mirror.

BACKGROUND ART

As a device for scanning a light beam, a light scanning device using a polygon mirror or a galvano mirror is widely spread. A small-sized light scanning device using a MEMS mirror device manufactured by means of MEMS (Micro Electro Mechanical Systems) technology has been also proposed. The MEMS mirror device is a device that moves a scan mirror, which includes components such as an elastic beam which are integrally molded with silicon or the like, in a reciprocating motion by electromagnetic force, electrostatic force, or the like, and is a minute electronic mechanical component that is capable of scanning a light beam.

There is a proposition of an image projection apparatus that forms one image by displaying two display images on a screen with light beams, by using a MEMS mirror device (e.g., refer to patent reference 1). This apparatus joins two display images displayed as a result of an individual scan with two light beams emitted from two light sources so that they are slightly overlapped with each other, thereby displaying one large-area image.

PRIOR ART REFERENCE

Patent Reference

PATENT REFERENCE 1: Japanese Patent Application Publication No. 2004-527793 (FIG. 41, paragraph 0116)

SUMMARY OF THE INVENTION

Problem to be Solved by the Invention

However, patent reference 1 describes overlapping and joining two display images with each other, but does not describe a countermeasure against deterioration in image quality at a seam of the two display images. Thus, the device described in patent reference 1 has a problem that the seam of the two display images, that is, a boundary portion of the two display images is undesirably distinguishable by the naked eye as a strip-shaped or line-shaped region, or undesirably conspicuous.

Thus, the present invention is made to solve the problem of the above conventional art, and its object is to provide an image projection apparatus that is capable of displaying a large-sized high-quality image by joining a plurality of display images displayed by scanning a plurality of light beams, as if there is no seam therebetween, that is, so that no seam is distinguishable by the naked eye.

Means for Solving the Problem

An image projection apparatus according to the present invention includes: a first light source unit that emits a first light beam; a second light source unit that emits a second light beam; a display control unit that controls light emission timing of the first light beam to be emitted from the first light source unit and the second light beam to be emitted from the second light source unit; a scan mirror unit that includes a scan mirror which reflects the first light beam emitted from the first light source unit and the second light beam emitted from the second light source unit, and includes a drive unit which drives the scan mirror, the scan mirror unit scanning the first light beam and the second light beam simultaneously with the scan mirror, thereby displaying a first display image formed by the first light beam and a second display image formed by the second light beam so as to be arranged side by side on an image display screen; a scan mirror control unit that controls the scan mirror unit; and a light beam detector including a first light sensor and a second light sensor, the first light sensor and the second light sensor being arranged so that a boundary line between a first light reception surface of the first light sensor and a second light reception surface of the second light sensor is parallel with a line-shaped seam between the first display image and the second display image, the first light sensor being configured to receive the first light beam or the second light beam on the first light reception surface to output a detection signal, the second light sensor being configured to receive the first light beam or the second light beam on the second light reception surface to output a detection signal; wherein when the scan mirror control unit makes the first light reception surface and the second light reception surface irradiated with the first light beam corresponding to a predetermined number of pixels aligned in a direction orthogonal to the boundary line, the scan mirror control unit performs an adjustment of a position of the first display image on a basis of a difference between the detection signal output from the first light sensor and the detection signal output from the second light sensor, and when the scan mirror control unit makes the first light reception surface and the second light reception surface irradiated with the second light beam corresponding to a predetermined number of pixels aligned in a direction orthogonal to the boundary line, the scan mirror control unit performs an adjustment of a position of the second display image on a basis of a difference between the detection signal output from the first light sensor and the detection signal output from the second light sensor.

Effects of the Invention

In the present invention, the positions of the first display image and the second display image displayed by scanning the first light beam and the second light beam are adjusted on the basis of the difference between the first detection signal and the second detection signal output from the light beam detector. Hence, according to the present invention, the first display image and the second display image can be joined as if there is no seam therebetween, that is, so that no seam is distinguishable by the naked eye, and thus a large-sized high-quality image can be displayed.

BRIEF DESCRIPTION OF THE DRAWINGS

FIGS. 6(a) and 6(b) are diagrams illustrating a vertical drive signal generated by a vertical drive signal generator in the image projection apparatus according to the first and second embodiments and laser light emission timing corresponding to irradiation positions in a vertical direction.

FIGS. 17(a) to 17(c) are diagrams illustrating relationship between detection signals generated by detecting the second laser beam by the first light sensor and the second light sensor of the laser beam detector in the image projection apparatus according to the second embodiment and a position in the vertical direction of a second display image.

MODE FOR CARRYING OUT THE INVENTION

First Embodiment

Figure 1:
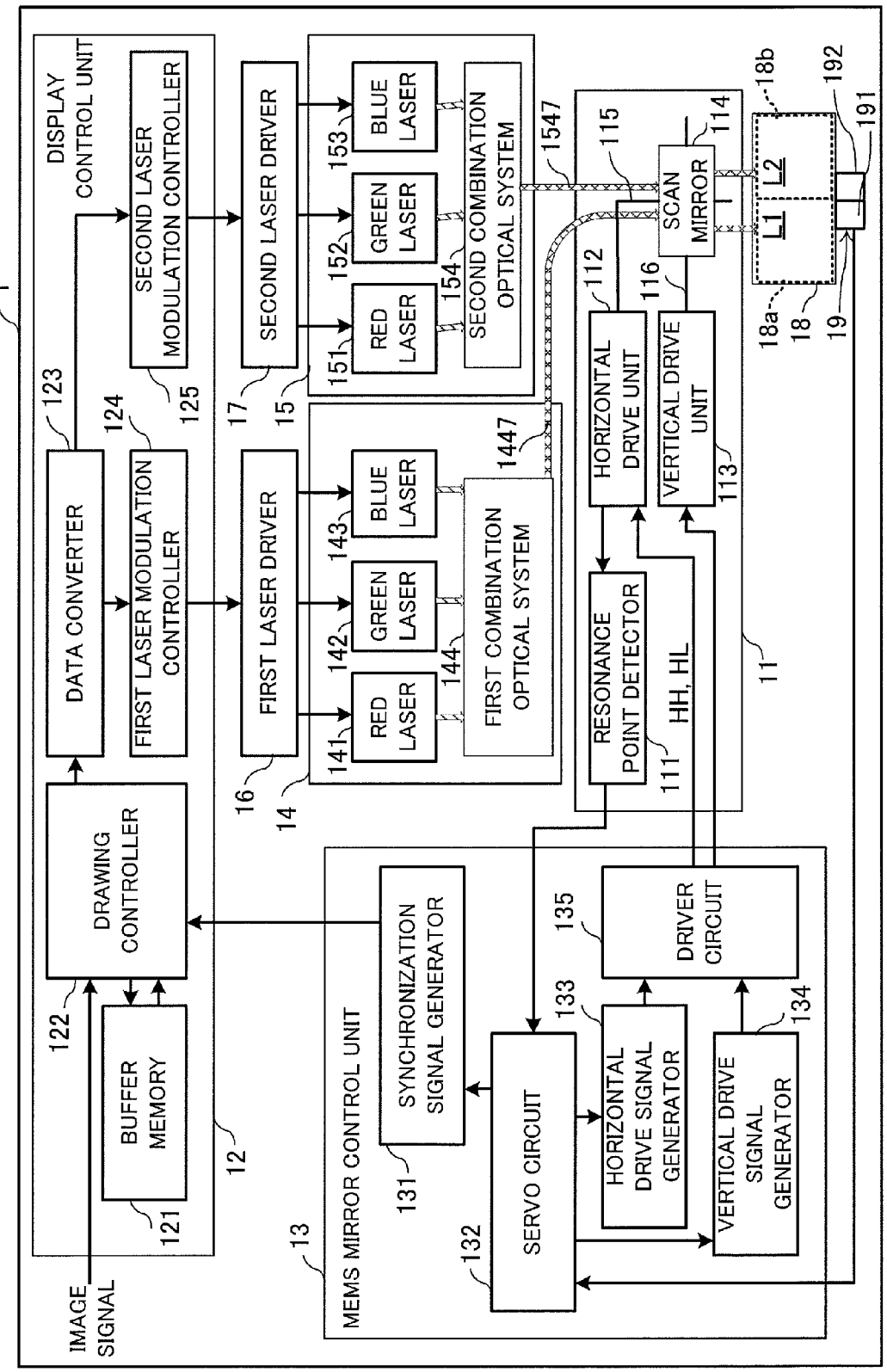
FIG. 1 is a block diagram schematically illustrating a configuration of an image projection apparatus according to a first embodiment of the present invention.

FIG. 1 is a block diagram schematically illustrating a configuration of an image projection apparatus 1 according to a first embodiment of the present invention. As illustrated in FIG. 1, the image projection apparatus 1 according to the first embodiment includes a MEMS mirror device 11 which is a scan mirror unit that scans a plurality of light beams (e.g., a first light beam and a second light beam), a display control unit 12 that controls emission of the light beams according to an input image signal, a MEMS mirror control unit 13 which is a scan mirror control unit, a first light source unit 14 that emits first laser beam as a first light beam, a second light source unit 15 that emits second laser beam as a second light beam, a first laser driver 16 which is a first light source drive unit that drives the first light source unit 14, a second laser driver 17 which is a second light source drive unit that drives the second light source unit 15, a screen 18 as an image display screen, and a laser beam detector 19 as a light beam detector. The image projection apparatus 1 according to the first embodiment performs raster-scanning with two laser beams on the screen 18 on the basis of the input image signal, thereby projecting one image (a combined image) including two display images arranged side by side in a horizontal direction (horizontal scan direction) on the screen 18. It is sufficient for the image signal to be a signal in the form that can be processed by the display control unit 12. The input image signal is, for example, an image signal supplied from a device (e.g., a broadcast receiver, a television, and so on) that has a function of receiving a broadcast wave, an image signal supplied from a device (e.g., an optical disc player, a car navigation device, a game device, and so on) having a reproduction function of reading an image signal from an information storage medium such as an optical disc or a hard disk, an image signal supplied from an information processing apparatus (e.g., a personal computer) that downloads image information via a network (e.g., the Internet), or the like.

As illustrated in FIG. 1, the display control unit 12 includes a buffer memory 121, a drawing controller 122, a data converter 123, a first laser modulation controller 124, and a second laser modulation controller 125. The display control unit 12 controls the first laser driver 16 and the second laser driver 17 on the basis of the input image signal.

The drawing controller 122 writes image data corresponding to the input image signal into the buffer memory 121. The buffer memory 121 temporarily stores the written image data. Moreover, the drawing controller 122 reads the image data stored in the buffer memory 121, and supplies the read image data to the data converter 123. The data converter 123 converts the image data supplied from the drawing controller 122 to bit data, and supplies it to the first laser modulation controller 124 and the second laser modulation controller 125.

The first laser modulation controller 124 converts the bit data supplied from the data converter 123, to a signal that represents light emission patterns of lasers of respective colors, and supplies it to the first laser driver 16. The first laser driver 16 generates drive signals for driving a red laser 141, a green laser 142, and a blue laser 143 (i.e., the lasers of the respective colors) provided in the first light source unit 14, on the basis of the signal output by the first laser modulation controller 124, and supplies these drive signals to the red laser 141, the green laser 142, and the blue laser 143, respectively.

The second laser modulation controller 125 converts the bit data supplied from the data converter 123, to a signal that represents light emission patterns of lasers of the respective colors, and supplies it to the second laser driver 17. The second laser driver 17 generates drive signals for driving a red laser 151, a green laser 152, and a blue laser 153 (i.e., the lasers of the respective colors) provided in the second light source unit 15, on the basis of the signal output by the second laser modulation controller 125, and supplies these drive signals to the red laser 151, the green laser 152, and the blue laser 153, respectively.

The red laser 141, the green laser 142, and the blue laser 143 emit a red laser beam, a green laser beam, and a blue laser beam toward a first combination optical system 144, on the basis of the drive signals supplied from the first laser driver 16. The first combination optical system 144 combines the red laser beam, the green laser beam, and the blue laser beam emitted from the red laser 141, the green laser 142, and the blue laser 143, and thus generates a single laser beam (a beam-shaped light ray), i.e., a first laser beam L1 as a first light beam. The first laser beam L1 is emitted to a scan mirror (a movable mirror) 114 of the MEMS mirror device 11 through an optical fiber 1447 as a light path changing member. The member that leads the first laser beam L1 to the MEMS mirror device 11 is not limited to the optical fiber 1447, and it may be another light path changing member such as a mirror. Alternatively, the first combination optical system 144 may be arranged so that the first laser beam L1 is lead to the MEMS mirror device 11 directly from the first combination optical system 144, without using the light path changing member.

In the same way, the red laser 151, the green laser 152, and the blue laser 153 emit a red laser beam, a green laser beam, and a blue laser beam toward a second combination optical system 154, on the basis of the drive signals output from the second laser driver 17. The second combination optical system 154 combines the red laser beam, the green laser beam, and the blue laser beam emitted from the red laser 151, the green laser 152, and the blue laser 153, and thus generates a single laser beam (a beam-shaped light ray), i.e., a second laser beam L2 as a second light beam. The second laser beam L2 is emitted to the scan mirror 114 of the MEMS mirror device 11 through an optical fiber 1547 as a light path changing member. The member that leads the second laser beam L2 to the MEMS mirror device 11 is not limited to the optical fiber 1547, and it may be another light path changing member such as a mirror. Alternatively, the second combination optical system 154 may be arranged so that the second laser beam L2 is lead to the MEMS mirror device 11 directly from the second combination optical system 154, without using the light path changing member.

The MEMS mirror device 11 includes a resonance point detector 111, a horizontal drive unit 112, a vertical drive unit 113, and the scan mirror 114. By driving the scan mirror 114 to change the direction of the scan mirror 114, the MEMS mirror device 11 can reflect the first laser beam L1 emitted from the first combination optical system 144 and the second laser beam L2 emitted from the second combination optical system 154 toward the screen 18 simultaneously. A first display image 18a by the first laser beam L1 and a second display image 18b by the second laser beam L2 are formed on the screen simultaneously 18 by the MEMS mirror device 11. Moreover, the MEMS mirror device 11 makes the scan mirror 114 operate so that raster-scanning with the first laser beam L1 and the second laser beam L2 is performed on the screen 18 under control of the MEMS mirror control unit 13. This operation is detected by the resonance point detector 111 that detects a resonant state of the horizontal drive unit 112 of the MEMS mirror device 11, and the resonance point detector 111 supplies its detection signal to the MEMS mirror control unit 13.

The MEMS mirror control unit 13 controls the MEMS mirror device 11. The MEMS mirror control unit 13 includes a synchronization signal generator 131, a servo circuit 132, a horizontal drive signal generator 133, a vertical drive signal generator 134, and a driver circuit 135. The servo circuit 132 controls operation of the horizontal drive signal generator 133 (or operation of the horizontal drive signal generator 133 and/or the vertical drive signal generator 134), on the basis of a detection signal indicating a result of detection by the resonance point detector 111 provided in the MEMS mirror device 11 and detection signals (first detection signals A1, A2 and second detection signals B1, B2) indicating a result of detection by the laser beam detector 19. The driver circuit 135 amplifies the drive signals for the MEMS mirror device 11 which are output from the horizontal drive signal generator 133 and the vertical drive signal generator 134 to a predetermined level, and supplies them to the MEMS mirror device 11. The synchronization signal generator 131 generates a synchronization signal on the basis of the drive signals for the MEMS mirror device 11 which are controlled by the servo circuit 132, and supplies the generated synchronization signal to the drawing controller 122.

Figure 2:
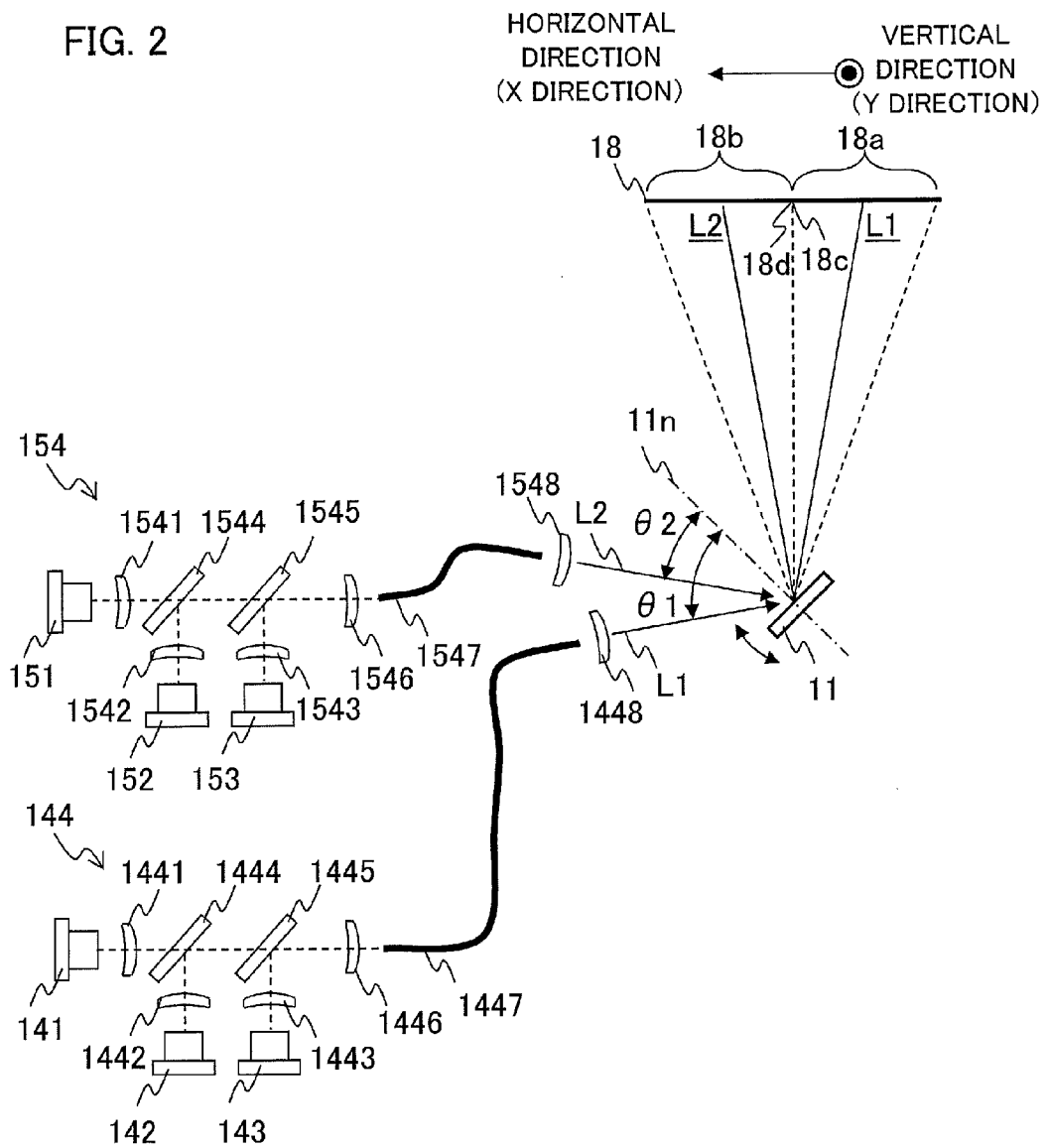
FIG. 2 is a diagram schematically illustrating a configuration of a first light source unit and a second light source unit in the image projection apparatus according to the first embodiment.

FIG. 2 is a diagram schematically illustrating components of the optical systems of the first light source unit 14 and the second light source unit 15. As illustrated in FIG. 2, the first light source unit 14 includes the red laser 141, the green laser 142, the blue laser 143, the optical fiber 1447, a condenser lens 1446, wavelength selective mirrors 1444 and 1445, and collimator lenses 1441, 1442, and 1443. The laser beams of the respective colors emitted from the red laser 141, the green laser 142, and the blue laser 143 are transformed into parallel light beams by the collimator lenses 1441, 1442, and 1443, respectively. The wavelength selective mirrors 1444 and 1445 are configured by dichroic mirrors, for example. The wavelength selective mirror 1444 allows the red laser beam emitted from the red laser 141 to pass through itself in a direction toward the condenser lens 1446, and reflects the green laser beam emitted from the green laser 142 in a direction toward the condenser lens 1446. The wavelength selective mirror 1445 allows the red laser beam and the green laser beam emitted from the red laser 141 and the green laser 142 to pass through itself in a direction toward the condenser lens 1446, and reflects the blue laser beam emitted from the blue laser 143 in a direction toward the condenser lens 1446. By the wavelength selective mirrors 1444 and 1445, the three laser beams of red, green, and blue are transformed into the single first laser beam L1. The condenser lens 1446 makes the first laser beam L1 enter an incident portion of the optical fiber 1447. The first laser beam L1 emitted from the optical fiber 1447 is changed to the first laser beam L1 which is substantially parallel light by the collimator lens 1448. The first laser beam L1 immediately before entering the scan mirror 114 of the MEMS mirror device 11 is emitted to the MEMS mirror device 11 so as to form, for example, an angle θ1 of 55° with a perpendicular line 11n of the scan mirror 114 (the scan mirror 114 when not driven) of the MEMS mirror device 11 in a plane which is perpendicular to the screen 18 and parallel with the horizontal direction (X direction) of the screen 18 (i.e., a plane parallel with a sheet on which FIG.

2 is drawn). In addition, the configuration of the first light source unit 14 is only an example, and not limited to the above example.

Moreover, as illustrated in FIG. 2, the second light source unit 15 includes the red laser 151, the green laser 152, the blue laser 153, the optical fiber 1547, a condenser lens 1546, wavelength selective mirrors 1544 and 1545, and collimator lenses 1541, 1542, and 1543. The laser beams of the respective colors emitted from the red laser 151, the green laser 152, and the blue laser 153 are transformed into parallel light beams by the collimator lenses 1541, 1542, and 1543, respectively. The wavelength selective mirrors 1544 and 1545 are configured by dichroic mirrors, for example. The wavelength selective mirror 1544 allows the red laser beam emitted from the red laser 151 to pass through itself in a direction toward the condenser lens 1546, and reflects the green laser beam emitted from the green laser 152 in a direction toward the condenser lens 1546. The wavelength selective mirror 1545 allows the red laser beam and the green laser beam emitted from the red laser 151 and the green laser 152 to pass through itself in a direction toward the condenser lens 1546, and reflects the blue laser beam emitted from the blue laser 153 in a direction toward the condenser lens 1546. By the wavelength selective mirrors 1544 and 1545, the three laser beams of red, green, and blue are transformed into the single second laser beam L2. The condenser lens 1546 makes the second laser beam L2 enter an incident portion of the optical fiber 1547. The second laser beam L2 emitted from the optical fiber 1547 is changed to the second laser beam L2 which is substantially parallel light by the collimator lens 1548. The second laser beam L2 immediately before entering the scan mirror 114 of the MEMS mirror device 11 is directed to the MEMS mirror device 11 so as to form an angle θ2 of 35° with the perpendicular line 11*n* of the scan mirror 114 (the scan mirror 114 when not driven) of the MEMS mirror device 11 in a plane which is perpendicular to the screen 18 and parallel with the horizontal direction (X direction) of the screen 18 (i.e., a plane parallel with a sheet on which FIG. 2 is drawn). In addition, the configuration of the second light source unit 15 is only an example, and is not limited to the above example.

Figure 3:
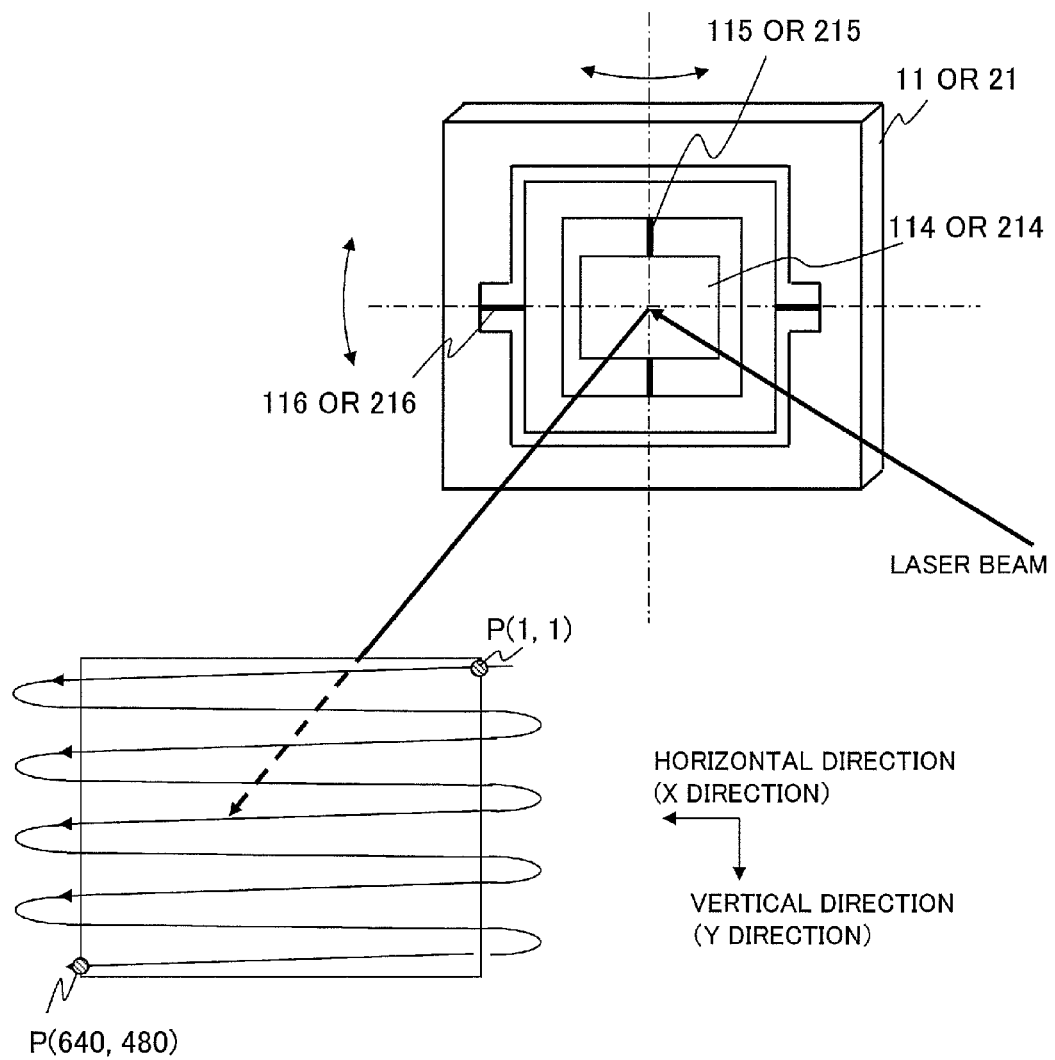
FIG. 3 is a diagram schematically illustrating the structure and a function of a MEMS mirror device in the image projection apparatus according to the first embodiment and a second embodiment.

FIG. 3 is a diagram schematically illustrating the structure and the function of the MEMS mirror device 11. In FIG. 3, reference characters that are used in the description of the second embodiment described later are also indicated. As illustrated in FIG. 3, the MEMS mirror device 11 includes the scan mirror 114 that is capable of turning around a horizontal-scan-use rotation center shaft (an elastic beam) 115 and capable of turning around a vertical-scan-use rotation center shaft (an elastic beam) 116. The scan mirror 114 two-dimensionally turns around each of the horizontal-scan-use rotation center shaft 115 and the vertical-scan-use rotation center shaft 116, and thereby it is possible to perform raster-scanning with the laser beams reflected by the scan mirror 114 (for example, to raster-scan the first laser beam L1 and the second laser beam L2 simultaneously). The first laser beam L1 and the second laser beam L2 reflected by the MEMS mirror device 11 are directed toward the screen 18. By controlling a tilt of the MEMS mirror device 11, raster-scanning is performed with the laser beam with which the screen 18 is irradiated. A position of a pixel on the display image is represented by P(X, Y), where X is a coordinate position (a pixel position) of the horizontal direction (the horizontal scan direction, i.e., X direction), and Y is a coordinate position (a pixel position) of the vertical direction (the vertical scan direction, i.e., Y direction). When each of the first display image 18*a* and the second display image 18*b* is an image of 640 pixels wide (the horizontal direction) by 480 pixels tall (the vertical direction) in size, the light beam is continuously scanned from a start position P(1, 1) at an upper edge to an end position P(640, 480) at a lower edge in each of the first display image 18*a* and the second display image 18*b*, and thus one display of the first display image 18*a* and the second display image 18*b* is completed.

Figure 4:
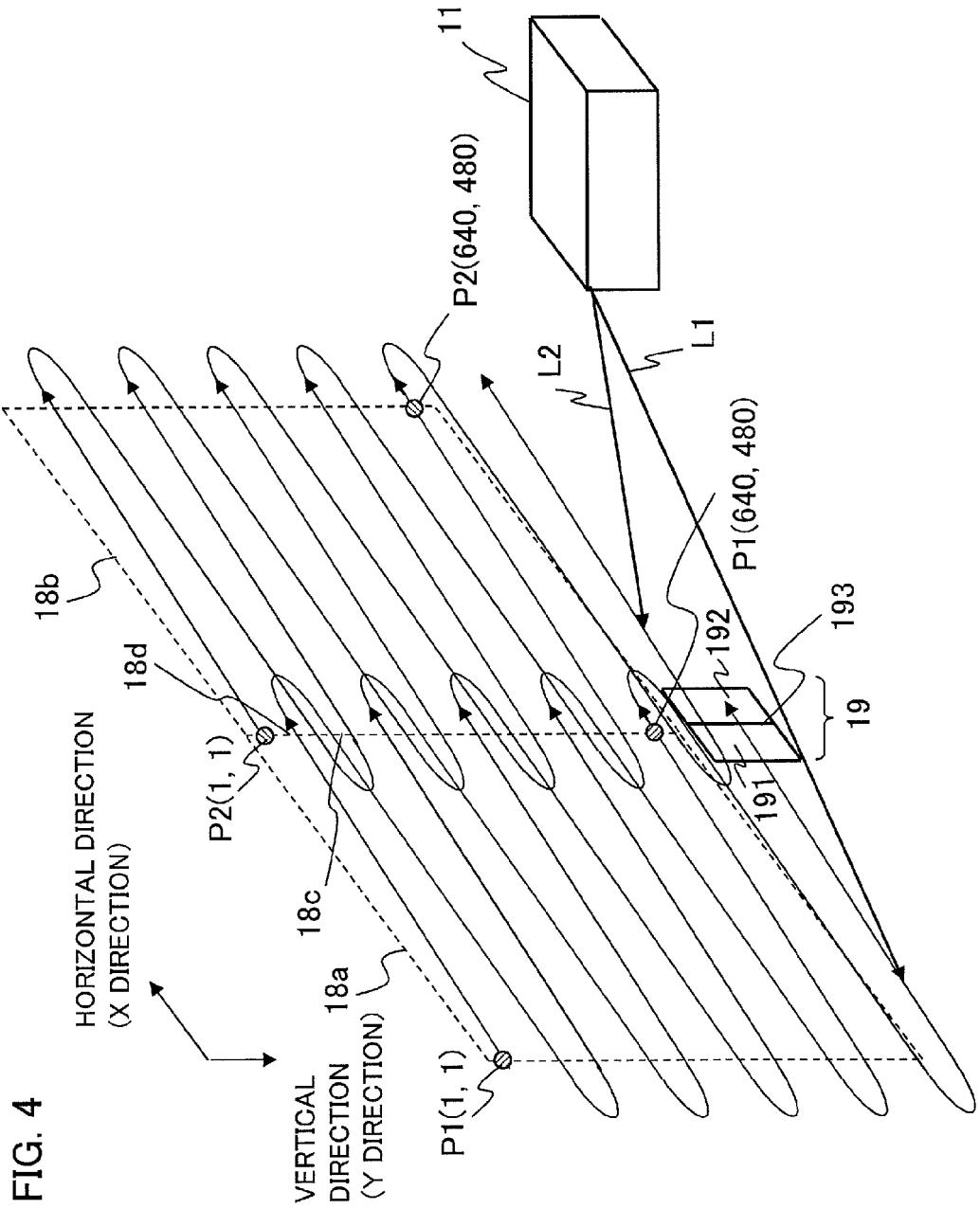
FIG. 4 is a diagram showing that one image is displayed by raster-scanning two laser beams by the MEMS mirror device in the image projection apparatus according to the first embodiment.

FIG. 4 is a diagram showing that one image is displayed by scanning two laser beams by the MEMS mirror device 11 in the image projection apparatus 1 according to the first embodiment. As illustrated in FIG. 4, the first laser beam L1 modulated according to the image signal is continuously scanned (raster-scanned) from a start position P1(1, 1) at an upper edge of the first display image 18*a* to an end position P1(640, 480) at a lower edge of the first display image 18*a*, and thus one display of the first display image 18*a* is completed. At the same time, the second laser beam L2 modulated according to the image signal is continuously scanned (raster-scanned) from a start position P2(1, 1) at an upper edge of the second display image 18*b* to an end position P2(640, 480) at a lower edge of the second display image 18*b*, and thus one display of the second display image 18*b* is completed. The screen 18 is irradiated with the first laser beam L1 and the second laser beam L2 simultaneously, and the first display image 18*a* and the second display image 18*b* are displayed on the screen 18 simultaneously, that is, in parallel in terms of time. The laser beam detector 19 is configured by a two-split light sensor including a first light sensor 191 having a first light reception surface and a second light sensor 192 having a second light reception surface, which are arranged in the horizontal direction and are adjacent to each other with a detection boundary line 193 therebetween. The first light sensor 191 and the second light sensor 192 output the first detection signals A1, A2 and the second detection signals B1, B2, which are proportional to levels of the received light beams, respectively. Here, the first detection signal A1 and the second detection signal B1 are output signals which are output when the first light sensor 191 and the second light sensor 192 detect the first light beam L1. The first detection signal A2 and the second detection signal B2 are output signals which are output when the first light sensor 191 and the second light sensor 192 detect the second light beam L2.

FIGS. 5(*a*) to 5(*c*) are diagrams illustrating a horizontal drive signal generated at the horizontal drive signal generator 133, a signal whose period is half of that of the horizontal drive signal, and laser light emission timing corresponding to irradiation positions P. As illustrated in FIG. 5(*a*), the horizontal drive signal is a square wave having a frequency of 20 kHz, for example. As illustrated in FIG. 5(*a*), the amplitude (peak value) of the waveform of a square wave shape is defined as HH and HL. It is indicated that:

among P(X, Y) representing pixel positions which are laser beam irradiation positions, pixels P(X, Y) within the range of X<1, and pixels P(X, Y) within the range of X>640, and pixels P(X, Y) within the range of Y<1, and pixels P(X, Y) within the range of Y>480 are outside the range of the display image of 640 pixels wide by 480 pixels tall. As illustrated in FIGS. 5(*b*) and 5(*c*), laser light emission for one line from P(1, 1) to P(640, 1) of the display image in the horizontal direction is performed within a time period equal to or smaller than a half period of the horizontal drive signal, and the light emission time period for one pixel is 30 nanoseconds.

FIGS. 6(a) and 6(b) are diagrams illustrating a vertical drive signal generated by the vertical drive signal generator 134 and laser light emission timing corresponding to irradiation positions P. As illustrated in FIGS. 6(a) and 6(b), in a case where an image composed of thirty frames per second is displayed, the period of the vertical drive signal is 1/30 second, i.e., approximately 33 milliseconds. FIG. 6(b) illustrates only laser light emission timing with respect to pixels at the left edge of the display image (i.e., P(l, k), where −49≤k≤530), and does not illustrate laser light emission timing with respect to other pixels (i.e., P(m, k), where m is an integer other than 1). Furthermore, as illustrated in FIG. 6(b), a display period for which one frame in the first or second display image is displayed is a period including P(1, 1) to P(1, 480) (the period from P(1, 1) to P(640, 480)). Moreover, in FIG. 6(a), the amplitude (peak value) of the sawtooth waveform of the vertical drive signal is defined as VH and VL.

Figure 7:
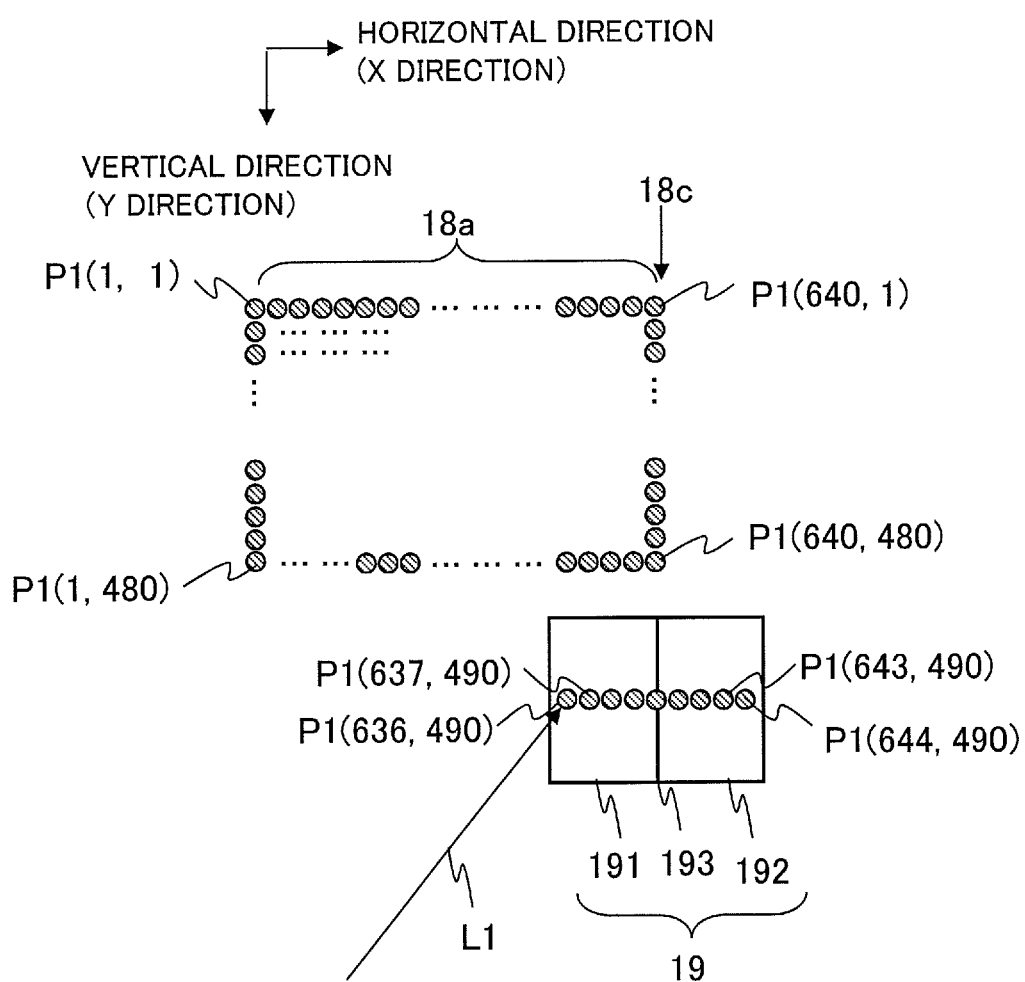
FIG. 7 is a diagram illustrating first laser beam detected by a first light sensor and a second light sensor of a laser beam detector in the image projection apparatus according to the first embodiment.

FIG. 7 is a diagram illustrating the first laser beam L1 detected by the first light sensor 191 and the second light sensor 192 of the laser beam detector 19 in the image projection apparatus 1 according to the first embodiment. In the image projection apparatus 1, the rectangular light reception surface of the first light sensor 191 and the rectangular light reception surface of the second light sensor 192 are irradiated with the first light beam L1 corresponding to a predetermined number of pixels aligned in the direction orthogonal to the boundary line 193, and at this time the position in the horizontal direction of the first display image 18a is adjusted so as to minimize the absolute value of the difference between the time width (pulse width) of the detection signal output from the first light sensor 191 and the time width (pulse width) of the detection signal output from the second light sensor 192. Moreover, the rectangular light reception surface of the first light sensor 191 and the rectangular light reception surface of the second light sensor 192 are irradiated with the second light beam L2 corresponding to a predetermined number of pixels aligned in the direction orthogonal to the boundary line 193, and at this time the position of the second display image 18b in the horizontal direction is adjusted so as to minimize the absolute value of the difference between the time width (pulse width) of the detection signal output from the first light sensor 191 and the time width (pulse width) of the detection signal output from the second light sensor 192. In the first embodiment, the predetermined number of pixels are nine pixels. The first laser beam L1 is emitted at light emission times with respect to the predetermined number of pixels outside the range of the first display image 18a, e.g., nine pixels of P1(636, 490) to P1(644, 490), and is received by the first light sensor 191 and the second light sensor 192. In addition, the number of pixels and the positions of the first laser beam L1 detected by the first light sensor 191 and the second light sensor 192 are not limited to the example of FIG. 7.

Figure 8:
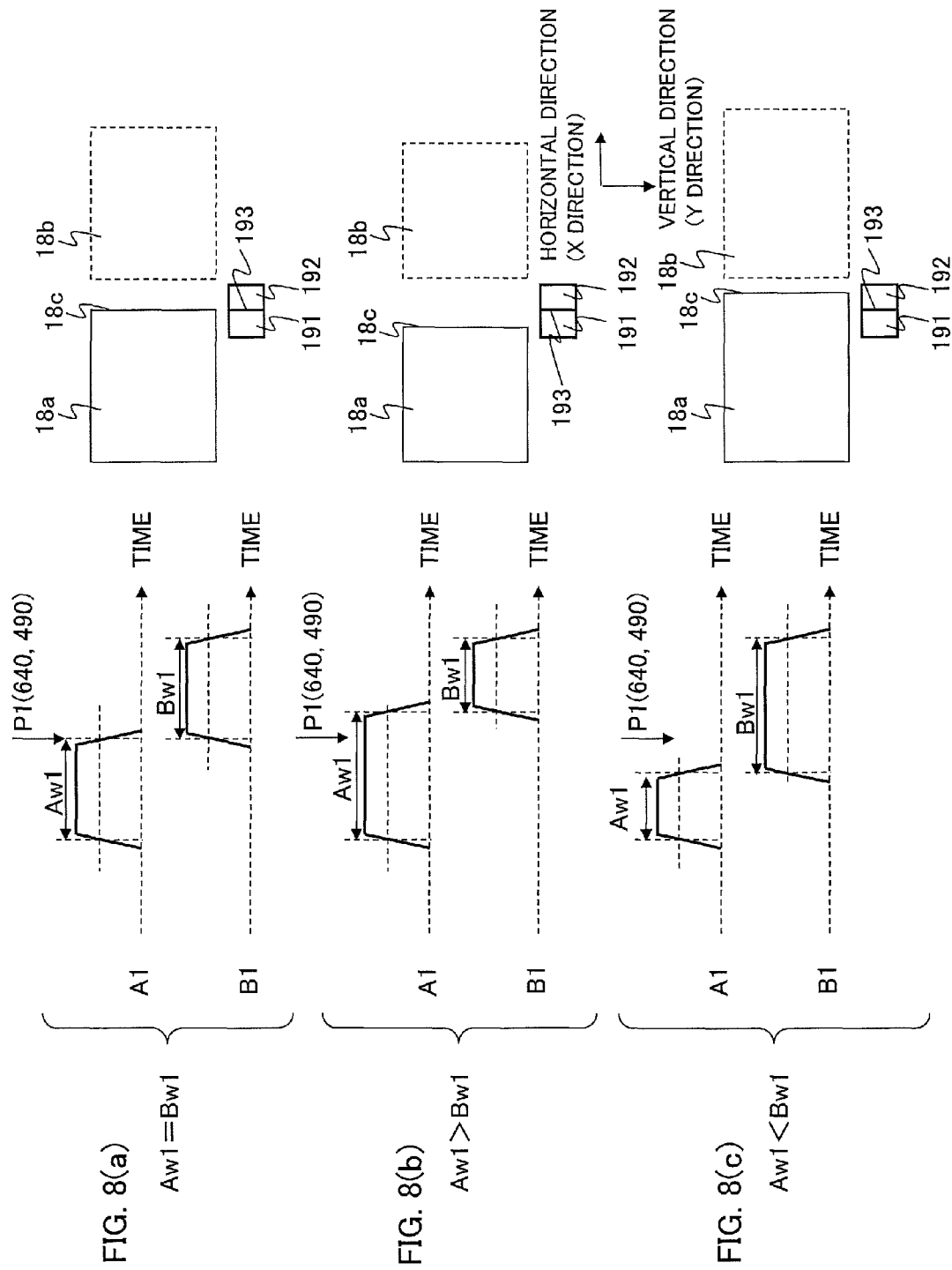
FIGS. 8(a) to 8(c) are diagrams illustrating relationship between detection signals generated by detecting the first laser beam by the first light sensor and the second light sensor of the laser beam detector in the image projection apparatus according to the first embodiment and a position in the horizontal direction of a first display image.

FIGS. 8(a) to 8(c) are diagrams illustrating relationship between the detection signals generated by detecting the first laser beam L1 by the first light sensor 191 and the second light sensor 192 of the laser beam detector 19 in the image projection apparatus 1 according to the first embodiment and a position 18c of an edge portion (a right edge) of the first display image 18a. As illustrated in FIGS. 8(a) to 8(c), the pulse width of the detection signal A1 (the time width in the time axis direction) is Aw1, and the pulse width of the detection signal B1 is Bw1. As illustrated in FIG. 8(a), when the pulse width Aw1 and the pulse width Bw1 are equal, the position in the horizontal direction of the right edge 18c of the first display image 18a accords with the position in the horizontal direction of the boundary line 193 (the straight line in the vertical direction) between the first light sensor 191 and the second light sensor 192. As illustrated in FIG. 8(b), when the pulse width Aw1 is larger than the pulse width Bw1, the position in the horizontal direction of the right edge 18c of the first display image 18a is shifted to the side of the first light sensor 191 from the position in the horizontal direction of the boundary line 193 between the first light sensor 191 and the second light sensor 192. As illustrated in FIG. 8(c), when the pulse width Aw1 is smaller than the pulse width Bw1, the position in the horizontal direction of the right edge 18c of the first display image 18a is shifted to the side of the second light sensor 192 from the position in the horizontal direction of the boundary line 193 between the first light sensor 191 and the second light sensor 192. The servo circuit 132 can change the amplitude HL of the horizontal drive signal so as to make the pulse width Aw1 and the pulse width Bw1 equal, that is, so as to minimize the absolute value of the difference between the pulse width Aw1 and the pulse width Bw1, and thus performs control so that the position in the horizontal direction of the right edge 18c of the first display image 18a accords with the position in the horizontal direction of the boundary line 193 between the first light sensor 191 and the second light sensor 192.

Figure 9:
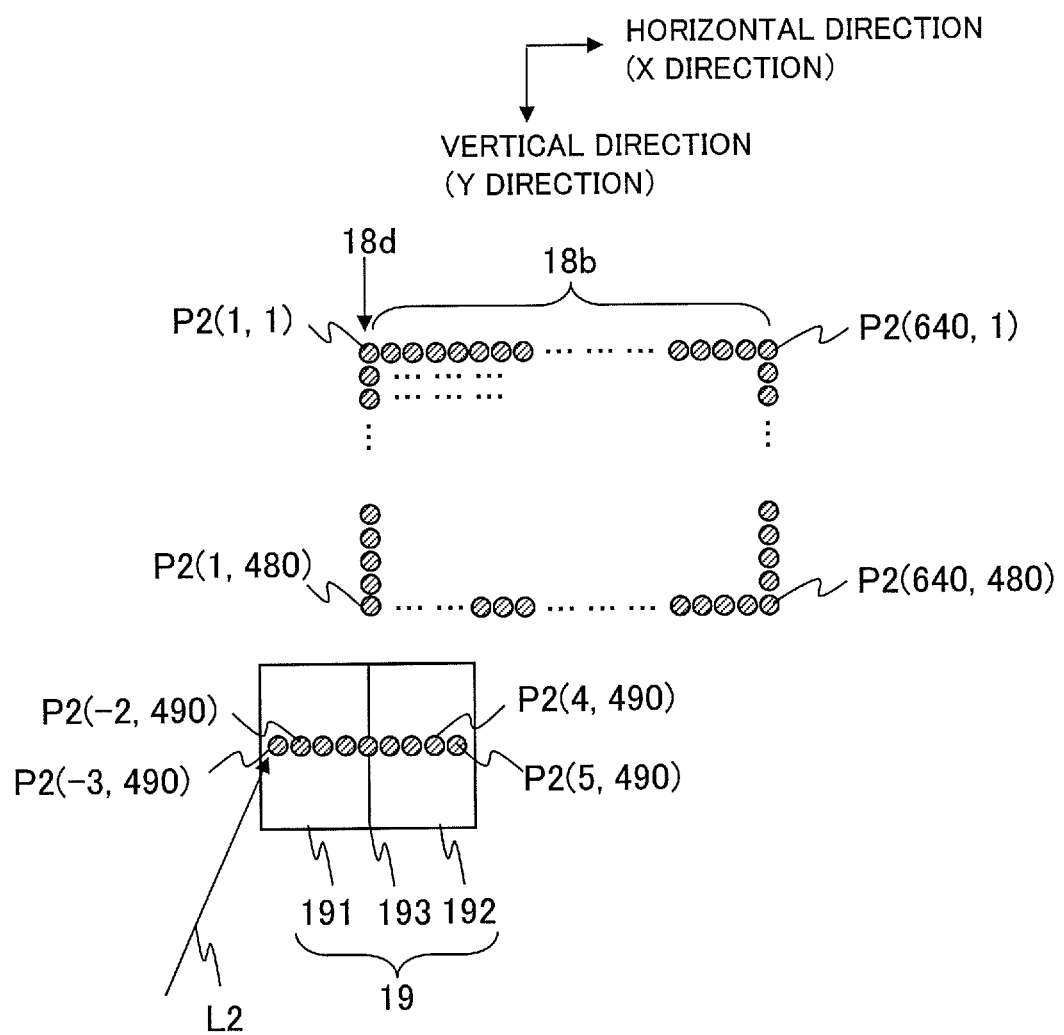
FIG. 9 is a diagram illustrating second laser beam detected by the first light sensor and the second light sensor of the laser beam detector in the image projection apparatus according to the first embodiment.

FIG. 9 is a diagram illustrating the second laser beam L2 detected by the first light sensor 191 and the second light sensor 192 of the laser beam detector 19 in the image projection apparatus 1 according to the first embodiment. The second laser beam L2 is emitted at light emission times with respect to a predetermined number of pixels outside the range of the second display image 18b, e.g., nine pixels of P2(−3, 490) to P2(5, 490), and is received by the first light sensor 191 and the second light sensor 192. In addition, the number of pixels and the positions of the second laser beam L2 detected by the first light sensor 191 and the second light sensor 192 are not limited to the example of FIG. 9.

Figure 10:
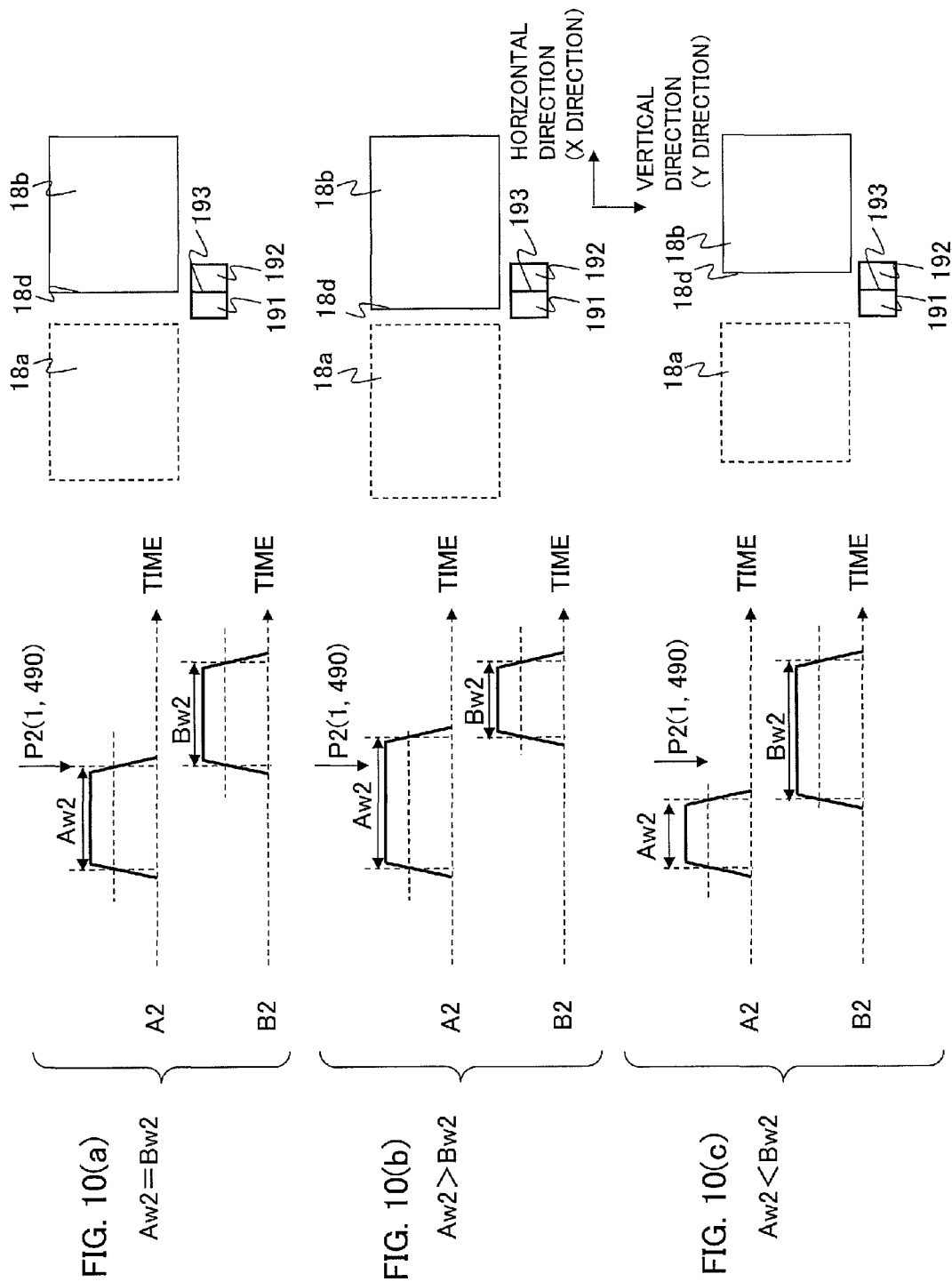
FIGS. 10(a) to 10(c) are diagrams illustrating relationship between detection signals generated by detecting the second laser beam by the first light sensor and the second light sensor of the laser beam detector in the image projection apparatus according to the first embodiment and a position in the horizontal direction of a second display image.

FIGS. 10(a) to 10(c) are diagrams illustrating relationship between the detection signals generated by detecting the second laser beam L2 by the first light sensor 191 and the second light sensor 192 of the laser beam detector 19 in the image projection apparatus 1 according to the first embodiment and a position 18d of an edge portion (a left edge) of the second display image 18b. As illustrated in FIGS. 10(a) to 10(c), the pulse width of the detection signal A2 is Aw2, and the pulse width of the detection signal B2 is Bw2. As illustrated in FIG. 10(a), when the pulse width Aw2 and the pulse width Bw2 are equal, the position in the horizontal direction of the left edge 18d of the second display image 18b accords with the position in the horizontal direction of the boundary line 193 between the first light sensor 191 and the second light sensor 192. As illustrated in FIG. 10(b), when the pulse width Aw2 is larger than the pulse width Bw2, the position in the horizontal direction of the left edge 18d of the second display image 18b is shifted to the side of the first light sensor 191 from the position in the horizontal direction of the boundary line 193 between the first light sensor 191 and the second light sensor 192. As illustrated in FIG. 10(c), when the pulse width Aw2 is smaller than the pulse width Bw2, the position in the horizontal direction of the left edge 18d of the second display image 18b is shifted to the side of the second light sensor 192 from the position in the horizontal direction of the boundary line 193 between the first light sensor 191 and the second light sensor 192. The servo circuit 132 can change the amplitude HH of the horizontal drive signal so as to make the pulse width Aw2 and the pulse width Bw2 equal, that is, so as to minimize the absolute value of the difference between the pulse width Aw2 and the pulse width Bw2, and thus performs control so that the position in the horizontal direction of the left edge 18d of the second display image 18b accords with the position in the horizontal direction of the boundary line 193 between the first light sensor 191 and the second light sensor 192.

As described above, in the image projection apparatus 1 according to the first embodiment, in order to make the position in the horizontal direction of the right edge 18c of the first display image 18a accord with the position in the horizontal direction of the left edge 18d of the second display image 18b which are displayed by scanning with the first light beam L1 and the second light beam L2, the amplitude HL and the amplitude HH of the horizontal drive signal are each controlled so as to minimize the absolute value of the difference between the pulse width of the first detection signal and the pulse width of the second detection signal which are output from the first light sensor 191 and the second light sensor 192 of the light beam detector 19. Thus, the image projection apparatus 1 according to the first embodiment makes it possible for both of the position in the horizontal direction of the right edge 18c of the first display image 18a and the position in the horizontal direction of the left edge 18d of the second display image 18b to accord with the position in the horizontal direction of the boundary line 193 between the first light sensor 191 and the second light sensor 192. Accordingly, the right edge 18c of the first display image 18a and the left edge 18d of the second display image 18b are aligned and joined with each other at the same position in the horizontal direction, and thus a single image is formed. Therefore, the first display image 18a and the second display image 18b can be joined with each other, as if there is no seam, that is, so that no seam is distinguishable by the naked eye, and thus one large-sized high-quality image can be displayed.

Second Embodiment

Figure 11:
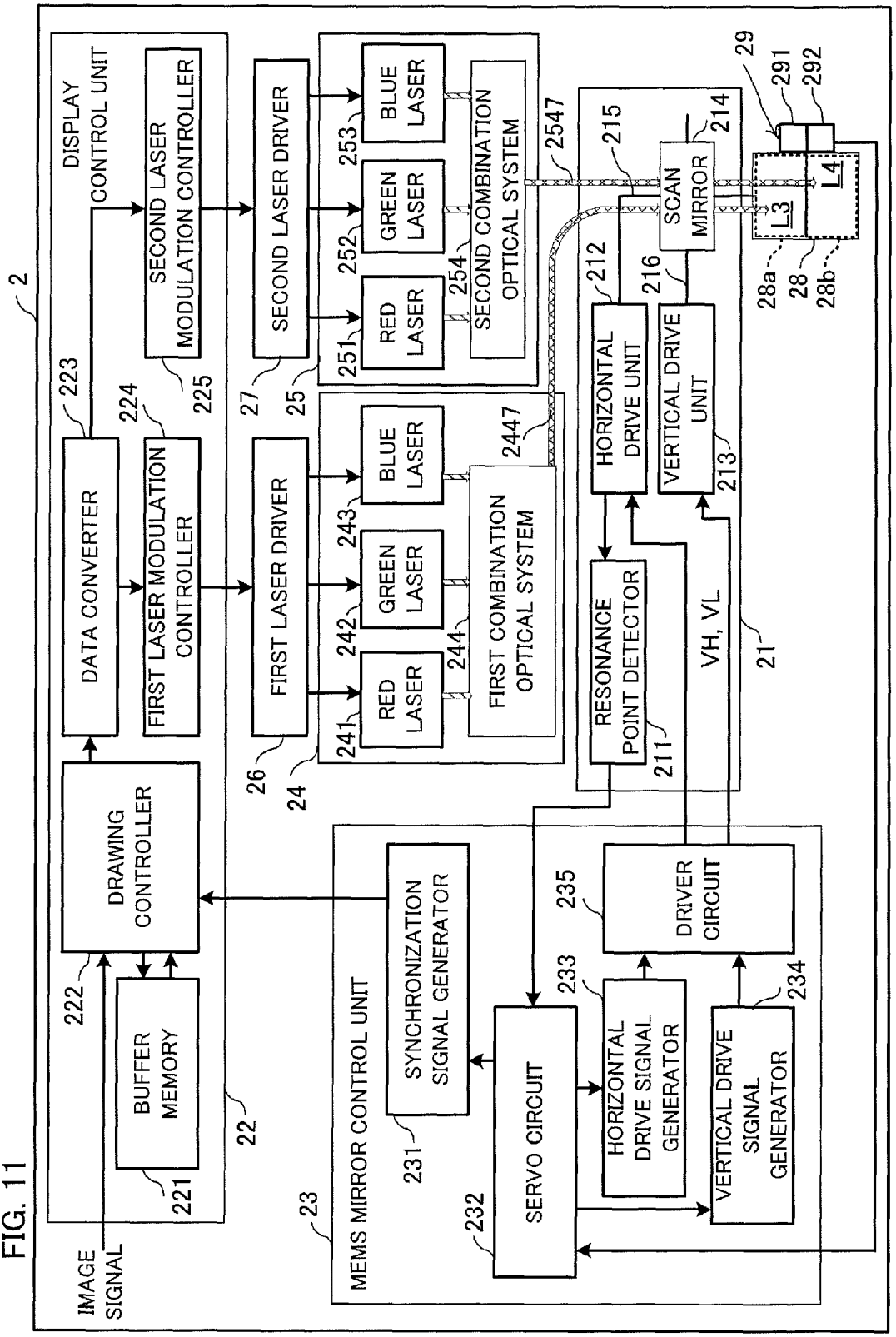
FIG. 11 is a block diagram schematically illustrating a configuration of an image projection apparatus according to the second embodiment of the present invention.

FIG. 11 is a block diagram schematically illustrating a configuration of an image projection apparatus 2 according to a second embodiment of the present invention. As illustrated in FIG. 11, the image projection apparatus 2 according to the second embodiment includes a MEMS mirror device 21 which is a scan mirror unit that scans a plurality of light beams (e.g., a first light beam and a second light beam), a display control unit 22 that controls emission of the light beams according to an input image signal, a MEMS mirror control unit 23 which is a scan mirror control unit, a first light source unit 24 that emits first laser beam as a first light beam, a second light source unit 25 that emits second laser beam as a second light beam, a first laser driver 26 which is a first light source drive unit that drives the first light source unit 24, a second laser driver 27 which is a second light source drive unit that drives the second light source unit 25, a screen 28 as an image display screen, and a laser beam detector 29 as a light beam detector. The image projection apparatus 2 according to the second embodiment performs raster-scanning with two laser beams on the screen 28 on the basis of the input image signal, thereby projecting one image (a combined image) including two display images arranged side by side in a vertical direction on the screen 28. Operation of the image projecting apparatus 2 is the same as that of the image projection apparatus 1 according to the first embodiment, except that the image projection apparatus 2 is configured to project one image (a combined image) including two display images arranged side by side in the vertical direction.

As illustrated in FIG. 11, the display control unit 22 includes a buffer memory 221, a drawing controller 222, a data converter 223, a first laser modulation controller 224, and a second laser modulation controller 225. The operation of the display control unit 22 is the same as the operation of the display control unit 12 in the first embodiment.

The first laser modulation controller 224 converts bit data supplied from the data converter 223, to a signal that represents light emission patterns of lasers of respective colors, and supplies it to the first laser driver 26. The first laser driver 26 generates drive signals for driving a red laser 241, a green laser 242, and a blue laser 243 provided in the first light source unit 24, on the basis of the signal output by the first laser modulation controller 224, and supplies these drive signals to the red laser 241, the green laser 242, and the blue laser 243, respectively.

The second laser modulation controller 225 converts the bit data supplied from the data converter 223, to a signal that represents light emission patterns of lasers of the respective colors, and supplies it to the second laser driver 27. The second laser driver 27 generates drive signals for driving a red laser 251, a green laser 252, and a blue laser 253 provided in the second light source unit 25, on the basis of the signal output by the second laser modulation controller 225, and supplies these drive signals to the red laser 251, the green laser 252, and the blue laser 253, respectively.

The red laser 241, the green laser 242, and the blue laser 243 emit a red laser beam, a green laser beam, and a blue laser beam toward a first combination optical system 244. The first combination optical system 244 combines the red laser beam, the green laser beam, and the blue laser beam, and thus generates a first laser beam L3 as a first light beam. The first laser beam L3 is emitted to a scan mirror (a movable mirror) 214 of the MEMS mirror device 21 through an optical fiber 2447 as a light path changing member. The member that leads the first laser beam L3 to the MEMS mirror device 21 is not limited to the optical fiber 2447, and it may be another light path changing member such as a mirror. Alternatively, the first combination optical system 244 may be arranged so that the first laser beam L3 is lead to the MEMS mirror device 21 directly from the first combination optical system 244, without using the light path changing member.

In the same way, the red laser 251, the green laser 252, and the blue laser 253 emit a red laser beam, a green laser beam, and a blue laser beam toward a second combination optical system 254. The second combination optical system 254 combines the red laser beam, the green laser beam, and the blue laser beam, and thus generates a second laser beam L4 as a second light beam. The second laser beam L4 is emitted to a scan mirror 214 of the MEMS mirror device 21 through an optical fiber 2547 as a light path changing member. The member that leads the second laser beam L4 to the MEMS mirror device 21 is not limited to the optical fiber 2547, and it may be another light path changing member such as a mirror. Alternatively, the second combination optical system 254 may be arranged so that the second laser beam L4 is lead to the MEMS mirror device 21 directly from the second combination optical system 254, without using the light path changing member.

The MEMS mirror device 21 includes a resonance point detector 211, a horizontal drive unit 212, a vertical drive unit 213, and the scan mirror 214. By driving the scan mirror 214 to change the direction of the scan mirror 214, the MEMS mirror device 21 can reflect the first laser beam L3 emitted from the first combination optical system 244 and the second laser beam L4 emitted from the second combination optical system 254 toward the screen 28 simultaneously. Thus, in the MEMS mirror device 21, a first display image 28a by the first laser beam L3 and a second display image 28b by the second laser beam L4 are formed on the screen 28 simultaneously. Moreover, the MEMS mirror device 21 makes the scan mirror 214 operate so that raster-scanning with the first laser beam L3 and the second laser beam L4 is performed on the screen 28 under control of the MEMS mirror control unit 23. This operation is detected by the resonance point detector 211 that detects a resonant state of the horizontal drive unit 212 of the MEMS mirror device 21, and the resonance point detector 211 supplies its detection signal to the MEMS mirror control unit 23.

The MEMS mirror control unit 23 controls the MEMS mirror device 21. The MEMS mirror control unit 23 includes a synchronization signal generator 231, a servo circuit 232, a horizontal drive signal generator 233, a vertical drive signal generator 234, and a driver circuit 235. The servo circuit 232 controls operation of the vertical drive signal generator 234 (or operation of the horizontal drive signal generator 233 and/or the vertical drive signal generator 234), on the basis of a detection signal indicating a result of detection by the resonance point detector 211 provided in the MEMS mirror device 21 and detection signals (first detection signals A3, A4 and second detection signals B3, B4) indicating a result of detection by the laser beam detector 29. The driver circuit 235 amplifies the drive signals for the MEMS mirror device 21 which are output from the horizontal drive signal generator 233 and the vertical drive signal generator 234 to a predetermined level, and supplies them to the MEMS mirror device 21. The synchronization signal generator 231 generates a synchronization signal on the basis of the drive signals for the MEMS mirror device 21 which are controlled by the servo circuit 232, and supplies the generated synchronization signal to the drawing controller 222.

Figure 12:
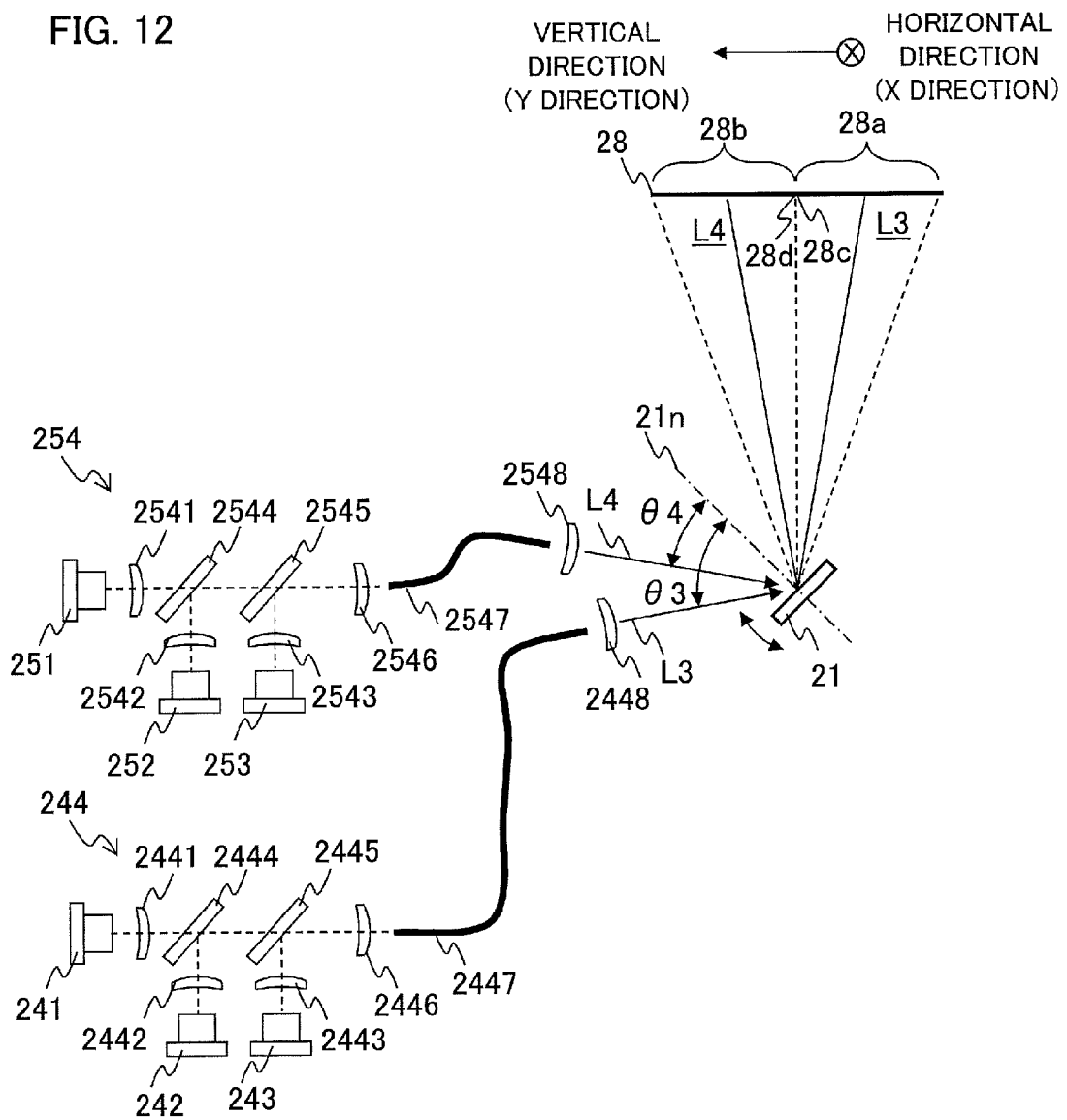
FIG. 12 is a diagram schematically illustrating a configuration of a first light source unit and a second light source unit in the image projection apparatus according to the second embodiment.

FIG. 12 is a diagram schematically illustrating components of the optical systems of the first light source unit 24 and the second light source unit 25. As illustrated in FIG. 12, the first light source unit 24 includes the red laser 241, the green laser 242, the blue laser 243, the optical fiber 2447, a condenser lens 2446, wavelength selective mirrors 2444 and 2445, and collimator lenses 2441, 2442, and 2443. The laser beams of the respective colors emitted from the red laser 241, the green laser 242, and the blue laser 243 are transformed into parallel light beams by the collimator lenses 2441, 2442, and 2443 respectively. The wavelength selective mirrors 2444 and 2445 are configured by dichroic mirrors, for example. The wavelength selective mirror 2444 allows the red laser beam emitted from the red laser 241 to pass through itself in a direction toward the condenser lens 2446, and reflects the green laser beam emitted from the green laser 242 in a direction toward the condenser lens 2446. The wavelength selective mirror 2445 allows the red laser beam and the green laser beam emitted from the red laser 241 and the green laser 242 to pass through itself in a direction toward the condenser lens 2446, and reflects the blue laser beam emitted from the blue laser 243 in a direction toward the condenser lens 2446. By the wavelength selective mirrors 2444 and 2445, the three laser beams of red, green, and blue are transformed into the single first laser beam L3. The condenser lens 2446 makes the first laser beam L3 enter an incident portion of the optical fiber 2447. The first laser beam L3 emitted from the optical fiber 2447 is changed to the first laser beam L3 which is substantially parallel light by the collimator lens 2448. The first laser beam L3 immediately before entering the scan mirror 214 of the MEMS mirror device 21 is directed to the MEMS mirror device 21 so as to form, for example, an angle $\theta 3$ of 55° with a perpendicular line $21n$ of the scan mirror 214 (the scan mirror 214 when not driven) of the MEMS mirror device 21 in a plane which is perpendicular to the screen 28 and parallel with the vertical direction (Y direction) of the screen 28 (i.e., a plane parallel with a sheet on which FIG. 12 is drawn). In addition, the configuration of the first light source unit 24 is only an example, and is not limited to the above example.

Moreover, as illustrated in FIG. 12, the second light source unit 25 includes the red laser 251, the green laser 252, the blue laser 253, the optical fiber 2547, a condenser lens 2546, wavelength selective mirrors 2544 and 2545, and collimator lenses 2541, 2542 and 2543. The laser beams of the respective colors emitted from the red laser 251, the green laser 252, and the blue laser 253 are transformed into parallel light beams by the collimator lenses 2541, 2542, and 2543, respectively. The wavelength selective mirrors 2544 and 2545 are configured by dichroic mirrors, for example. The wavelength selective mirror 2544 allows the red laser beam emitted from the red laser 251 to pass through itself in a direction toward the condenser lens 2546, and reflects the green laser beam emitted from the green laser 252 in a direction toward the condenser lens 2546. The wavelength selective mirror 2545 allows the red laser beam and the green laser beam emitted from the red laser 251 and the green laser 252 to pass through itself in a direction toward the condenser lens 2546, and reflects the blue laser beam emitted from the blue laser 253 in a direction toward the condenser lens 2546. By the wavelength selective mirrors 2544 and 2545, the three laser beams of red, green and blue are transformed into the single second laser beam L4. The condenser lens 2546 makes the second laser beam L4 enter an incident portion of the optical fiber 2547. The second laser beam L4 emitted from the optical fiber 2547 is changed to the second laser beam L4 which is substantially parallel light by the collimator lens 2548. The second laser beam L4 immediately before entering the scan mirror 214 of the MEMS mirror device 21 is directed to the MEMS mirror device 11 so as to form an angle $\theta 4$ of 35° with the perpendicular line $21n$ of the scan mirror 214 (the scan mirror 214 when not driven) of the MEMS mirror device 21 in a plane which is perpendicular to the screen 28 and parallel with the vertical direction (Y direction) of the screen 28 (i.e., a plane parallel with a sheet on which FIG. 12 is drawn). In addition, the configuration of the second light source unit 25 is only an example, and is not limited to the above example.

FIG. 3 is a diagram schematically illustrating the structure and the function of the MEMS mirror device 21. As illustrated in FIG. 3, the MEMS mirror device 21 includes a scan mirror 214 that is capable of turning around a horizontal-scan-use rotation center shaft (an elastic beam) 215 and capable of turning around a vertical-scan-use rotation center shaft (an elastic beam) 216. The scan mirror 214 two-dimensionally turns around each of the horizontal-scan-use rotation center shaft 215 and the vertical-scan-use rotation center shaft 216, and thereby it is possible to perform raster-scanning with the laser beams reflected by the scan mirror 214 (for example, to raster-scan the first laser beam L3 and the second laser beam L4 simultaneously). The first laser beam L3 and the second laser beam L4 reflected by the MEMS mirror device 21 are directed toward the screen 28.

By controlling a tilt of the MEMS mirror device 21, raster-scanning is performed with the laser beam with which the screen 28 is irradiated. When each of the first display image 28a and the second display image 28b is an image of 640 pixels wide (the horizontal direction) by 480 pixels tall (the vertical direction) in size, the light beam is continuously scanned from a start position P(1, 1) at an upper edge to an end position P(640, 480) at a lower edge in each of the first display image 28a and the second display image 28b, and thus one display of the first display image 28a or the second display image 28b is completed.

Figure 13:
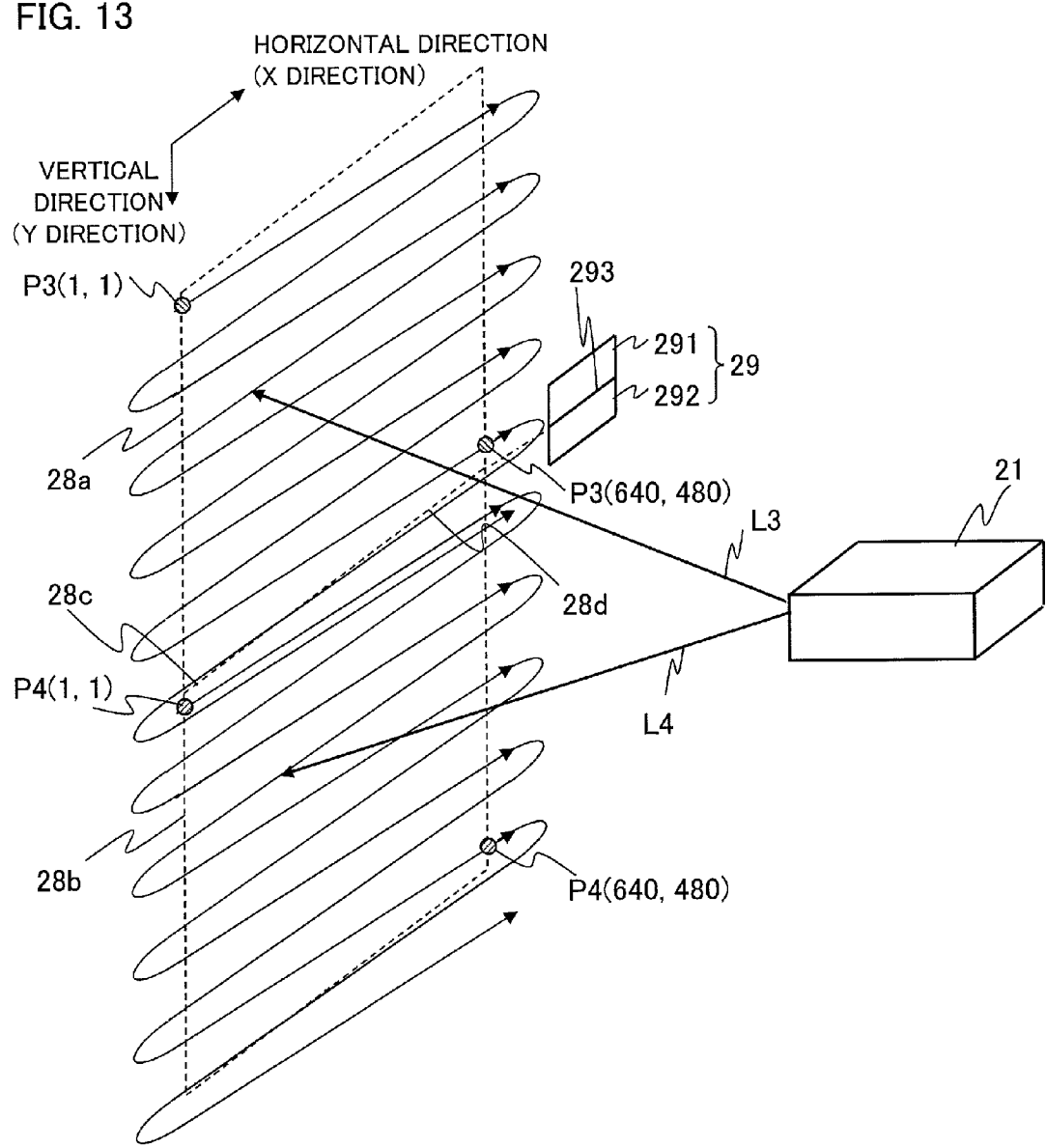
FIG. 13 is a diagram showing that one image is displayed by raster-scanning two laser beams by a MEMS mirror device in the image projection apparatus according to the second embodiment.

FIG. 13 is a diagram showing that one image is displayed by scanning two laser beams by the MEMS mirror device 21 in the image projection apparatus 2 according to the second embodiment. As illustrated in FIG. 13, the first laser beam L3 modulated according to the image signal is continuously scanned (raster-scanned) from a start position P3(1, 1) at an upper edge of the first display image 28a to an end position P3(640, 480) at a lower edge of the first display image 28a, and thus one display of the first display image 28a is completed. At the same time, the second laser beam L4 modulated according to the image signal is continuously scanned (raster-scanned) from a start position P4(1, 1) at an upper edge of the second display image 28b to an end position P4(640, 480) at a lower edge of the second display image 28b, and thus one display of the second display image 28b is completed. The screen 28 is irradiated with the first laser beam L3 and the second laser beam L4 simultaneously, and the first display image 28a and the second display image 28b are displayed on the screen 28 simultaneously, that is, in parallel in terms of time. The laser beam detector 29 is configured by a two-split light sensor including a first light sensor 291 having a first light reception surface and a second light sensor 292 having a second light reception surface, which are arranged in the vertical direction and are adjacent to each other with a detection boundary line 293 therebetween. The first light sensor 291 and the second light sensor 292 output the first detection signals A3, A4 and the second detection signals B3, B4, which are proportional to levels of the received light beams, respectively. Here, the first detection signal A3 and the second detection signal B3 are output signals which are output when the first light sensor 291 and the second light sensor 292 detect the first light beam L3. The first detection signal A4 and the second detection signal B4 are output signals which are output when the first light sensor 291 and the second light sensor 292 detect the second light beam L4.

Figure 5A:
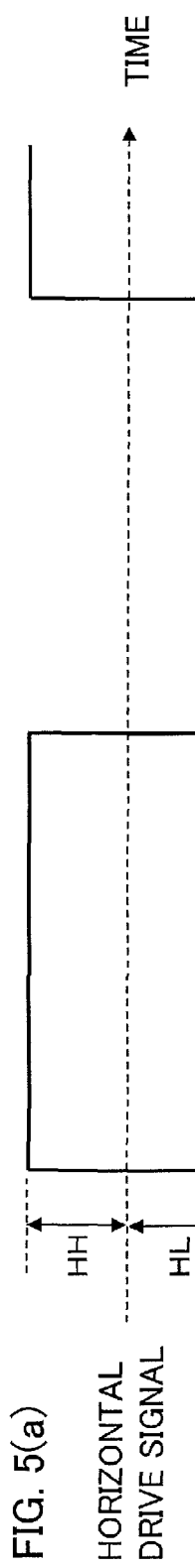
FIGS. 5(a) to 5(c) are diagrams illustrating a horizontal drive signal generated by a horizontal drive signal generator in the image projection apparatus according to the first and second embodiments and laser light emission timing corresponding to irradiation positions in a horizontal direction.
Figure 5B:
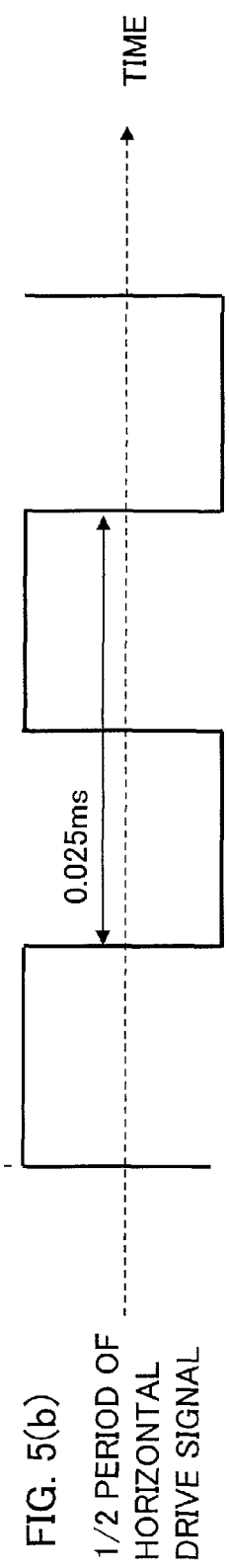
Figure 5C:
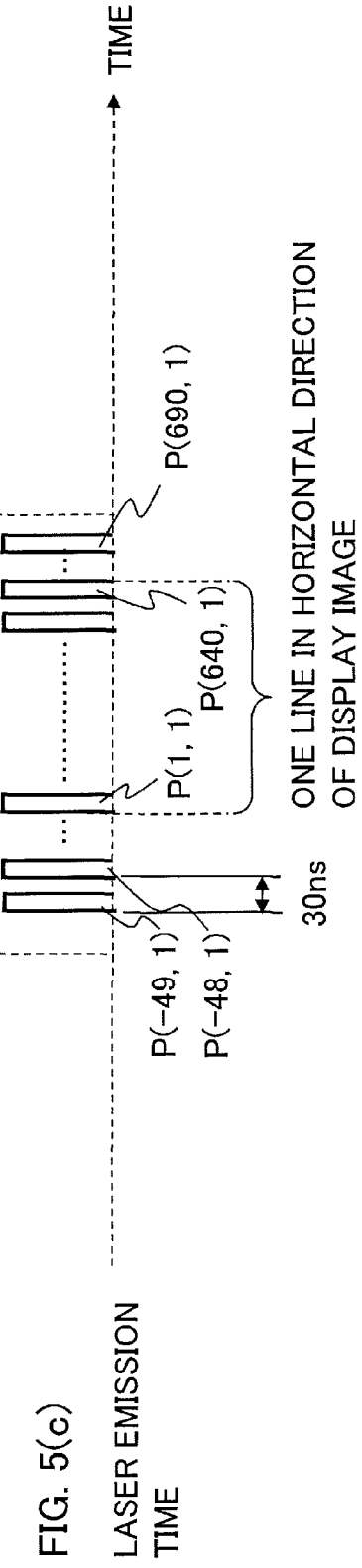

FIGS. 5(a) to 5(c) are diagrams illustrating a horizontal drive signal generated at the horizontal drive signal generator 233, a signal whose period is half of that of the horizontal drive signal, and laser light emission timing corresponding to irradiation positions P. As illustrated in FIG. 5(a), the horizontal drive signal is a square wave having a frequency of 20 kHz, for example. As illustrated in FIG. 5(a), the amplitude of the square wave is defined as HH and HL. It is indicated that:
among P(X, Y) representing pixel positions which are laser beam irradiation positions,
a pixel P(X, Y) within the range of X<1, and a pixel P(X, Y) within the range of X>640, and
a pixel P(X, Y) within the range of Y<1, and a pixel P(X, Y) within the range of Y>480
are outside the range of the display image of 640 pixels wide by 480 pixels tall. As illustrated in FIGS. 5(b) and 5(c), laser light emission for one line from P(1, 1) to P(640, 1) of the display image in the horizontal direction is performed within a time period equal to or smaller than a half period of the horizontal drive signal, and the light emission time period for one pixel is 30 nanoseconds.

FIGS. 6(a) and 6(b) are diagrams illustrating a vertical drive signal generated by the vertical drive signal generator 234 and laser light emission timing corresponding to irradiation positions P. As illustrated in FIGS. 6(a) and 6(b), in a case where an image composed of thirty frames per second is displayed, the period of the vertical drive signal is 1/30 second, i.e., approximately 33 milliseconds. As illustrated in FIG. 6(b), a display period for which one frame in the first or second display image is displayed is a period including P(1, 1) to P(1, 480) (the period from P(1, 1) to P(640, 480)). Moreover, in FIG. 6(a), the amplitude (peak value) of the sawtooth waveform of the vertical drive signal is defined as VH and VL.

Figure 14:
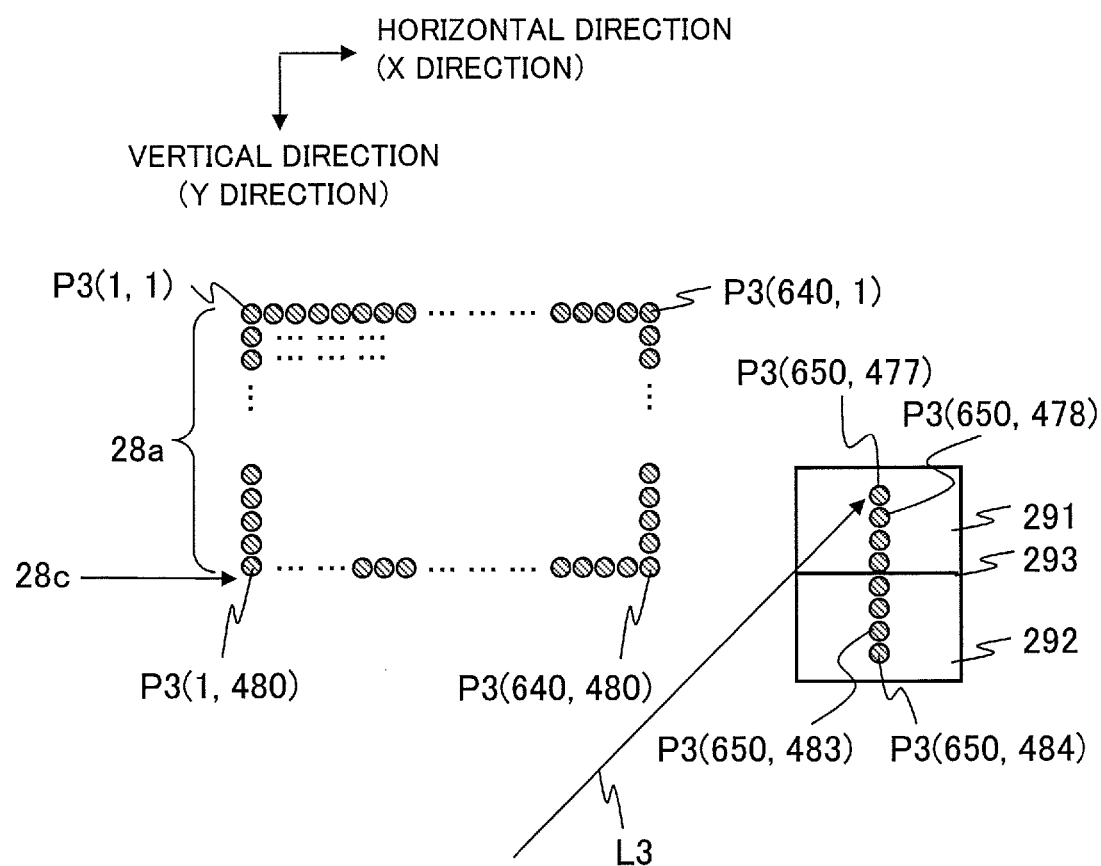
FIG. 14 is a diagram illustrating first laser beam detected by a first light sensor and a second light sensor of a laser beam detector in the image projection apparatus according to the second embodiment.

FIG. 14 is a diagram illustrating the first laser beam L3 detected by the first light sensor 291 and the second light sensor 292 of the laser beam detector 29 in the image projection apparatus 2 according to the second embodiment. In the image projection apparatus 2, the rectangular light reception surface of the first light sensor 291 and the rectangular light reception surface of the second light sensor 292 are irradiated with the first light beam L3 corresponding to a predetermined number of pixels aligned in the direction orthogonal to the boundary line 293, and at this time the position in the vertical direction of the first display image 28a is adjusted so as to minimize the absolute value of the difference between the time width (the width of pulse train) of the detection signal output from the first light sensor 291 and the time width (the width of pulse train) of the detection signal output from the second light sensor 292. Moreover, the rectangular light reception surface of the first light sensor 291 and the rectangular light reception surface of the second light sensor 292 are irradiated with the second light beam L4 corresponding to a predetermined number of pixels aligned in the direction orthogonal to the boundary line 293, and at this time the position in the vertical direction of the second display image 28b is adjusted so as to minimize the absolute value of the difference between the time width (the width of pulse train) of the detection signal output from the first light sensor 291 and the time width (the width of pulse train) of the detection signal output from the second light sensor 292. In the second embodiment, the predetermined number of pixels are eight pixels. The first laser beam L3 is emitted at light emission times with respect to the predetermined number of pixels outside the range of the first display image 18a, e.g., eight pixels of P3(650, 477) to P3(650, 484), and is received by the first light sensor 291 and the second light sensor 292. In addition, the number of pixels and the positions of the first laser beam L3 detected by the first light sensor 291 and the second light sensor 292 are not limited to the example of FIG. 14.

Figure 15:
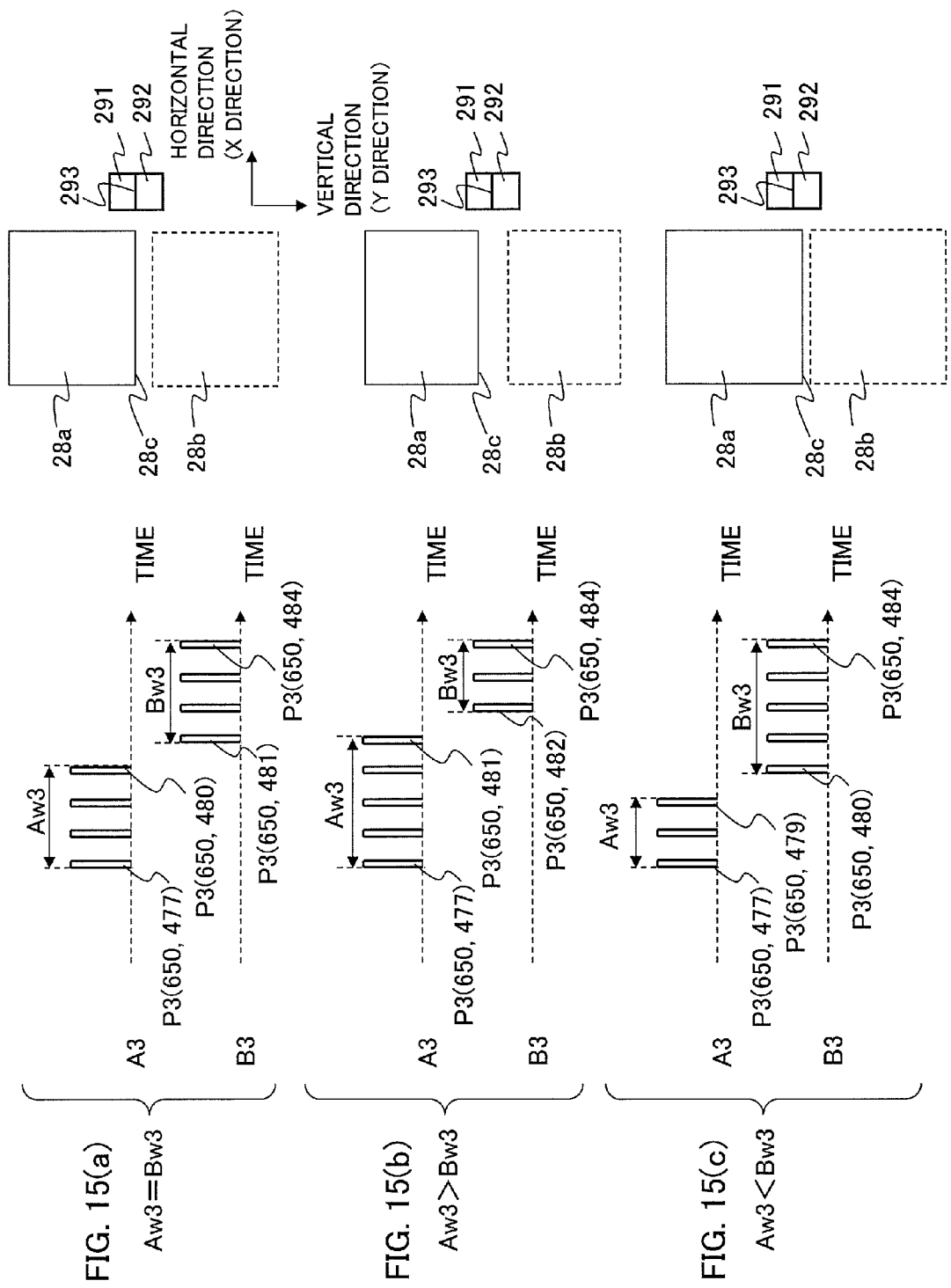
FIGS. 15(a) to 15(c) are diagrams illustrating relationship between detection signals generated by detecting the first laser beam by the first light sensor and the second light sensor of the laser beam detector in the image projection apparatus according to the second embodiment and a position in the vertical direction of a first display image.

FIGS. 15(a) to 15(c) are diagrams illustrating relationship between a position 28c of an edge portion (a lower edge) of the first display image 28a and the detection signals generated by detecting the detection of the first laser beam L3 by the first light sensor 291 and the second light sensor 292 of the laser beam detector 29 in the image projection apparatus 2 according to the second embodiment. As illustrated in FIGS. 15(a) to 15(c), the width of pulse train of the detection signal A3 (the time width in the time axis direction) is Aw3, and the width of pulse train of the detection signal B3 is Bw3. As illustrated in FIG. 15(a), when the width Aw3 of pulse train and the width Bw3 of pulse train are equal, the position in the vertical direction of the lower edge 28c of the first display image 28a accords with the position in the vertical direction of the boundary line 293 (the straight line in the horizontal direction) between the first light sensor 291 and the second light sensor 292. As illustrated in FIG. 15(*b*), when the width Aw3 of pulse train is larger than the width Bw3 of pulse train, the position in the vertical direction of the lower edge 28*c* of the first display image 28*a* is shifted to the side of the first light sensor 291 from the position in the vertical direction of the boundary line 293 between the first light sensor 291 and the second light sensor 292. As illustrated in FIG. 15(*c*), when the width Aw3 of pulse train is smaller than the width Bw3 of pulse train, the position in the vertical direction of the lower edge 28*c* of the first display image 28*a* is shifted to the side of the second light sensor 292 from the position in the vertical direction of the boundary line 293 between the first light sensor 291 and the second light sensor 292. The servo circuit 232 can change the amplitude VL of the vertical drive signal so as to make the width Aw3 of pulse train and the width Bw3 of pulse train equal, that is, so as to minimize the absolute value of the difference between the width Aw3 of pulse train and the width Bw3 of pulse train, and thus performs control so that the position in the vertical direction of the lower edge 28*c* of the first display image 28*a* accords with the position in the vertical direction of the boundary line 293 between the first light sensor 291 and the second light sensor 292.

Figure 16:
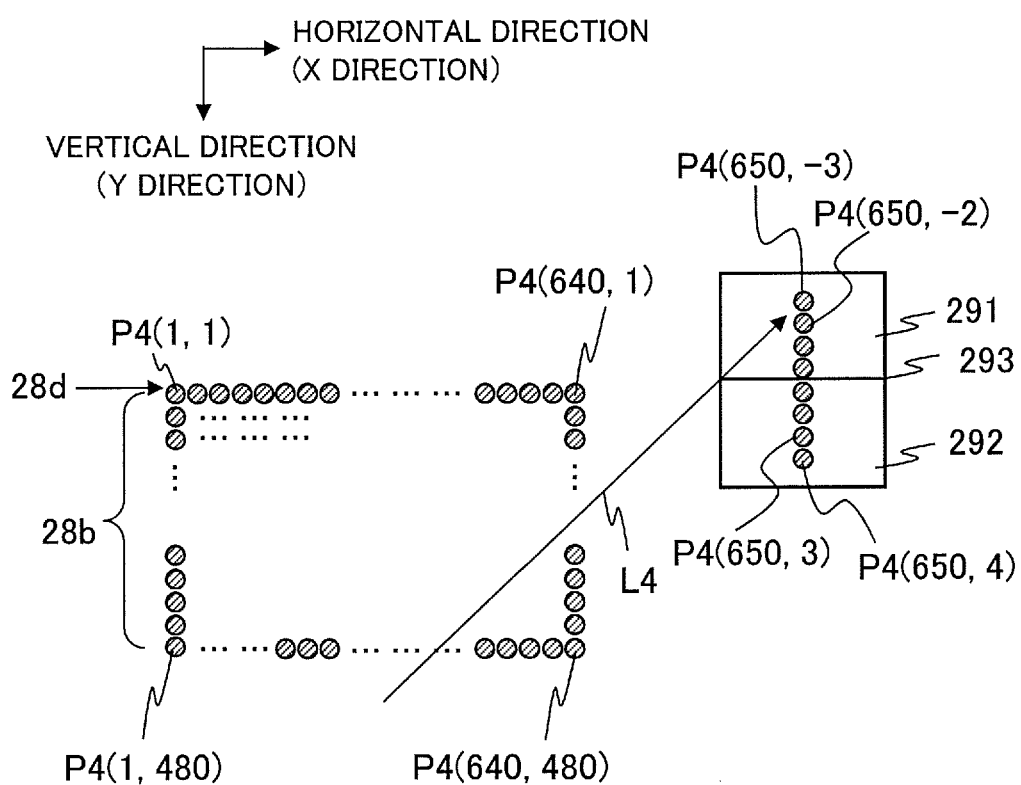
FIG. 16 is a diagram illustrating second laser beam detected by the first light sensor and the second light sensor of the laser beam detector in the image projection apparatus according to the second embodiment.

FIG. 16 is a diagram illustrating the second laser beam L4 detected by the first light sensor 291 and the second light sensor 292 of the laser beam detector 29 in the image projection apparatus 2 according to the second embodiment. The second laser beam L4 is emitted at light emission times with respect to a predetermined number of pixels outside the range of the second display image 28*b*, e.g., eight pixels from P4(650, −3) to P4(650, 4), and is received by the first light sensor 291 and the second light sensor 292. In addition, the number of pixels and the positions of the second laser beam L4 detected by the first light sensor 291 and the second light sensor 292 are not limited to the example of FIG. 16.

FIGS. 17(*a*) to 17(*c*) are diagrams illustrating relationship between a position 28*d* at an edge portion (an upper edge) of the second display image 28*b* and the detection signals generated by detecting the second laser beam L4 by the first light sensor 291 and the second light sensor 292 of the laser beam detector 29 in the image projection apparatus 2 according to the second embodiment. As illustrated in FIGS. 17(*a*) to 17(*c*), the width of pulse train of the detection signal A4 is Aw4, and the width of pulse train of the detection signal B4 is Bw4. As illustrated in FIG. 17(*a*), when the width Aw4 of pulse train and the width Bw4 of pulse train are equal, the position in the vertical direction of the upper edge 28*d* of the second display image 28*b* accords with the position in the vertical direction of the boundary line 293 between the first light sensor 291 and the second light sensor 292. As illustrated in FIG. 17(*b*), when the width Aw4 of pulse train is larger than the width Bw4 of pulse train, the position in the vertical direction of the upper edge 28*d* of the second display image 28*b* is shifted to the side of the first light sensor 291 from the position in the horizontal direction of the boundary line 293 between the first light sensor 291 and the second light sensor 292. As illustrated in FIG. 17(*c*), when the width Aw4 of pulse train is smaller than the width Bw4 of pulse train, the position in the vertical direction of the upper edge 28*d* of the second display image 28*b* is shifted to the side of the second light sensor 292 from the position in the vertical direction of the boundary line 293 between the first light sensor 291 and the second light sensor 292. The servo circuit 232 can change the amplitude VH of the vertical drive signal so as to make the width Aw4 of pulse train and the width Bw4 of pulse train equal, that is, so as to minimize the absolute value of the difference between the width AW4 of pulse train and the width BW4 of pulse train, and thus performs control so that the position in the vertical direction of the upper edge 28*d* of the second display image 28*b* accords with the position in the vertical direction of the boundary line 293 between the first light sensor 291 and the second light sensor 292.

As described above, in the image projection apparatus 2 according to the second embodiment, in order to make the position in the vertical direction of the lower edge 28*c* of the first display image 28*a* accord with the position in the vertical direction of the upper edge 28*d* of the second display image 28*b* which are displayed by scanning with the first light beam L3 and the second light beam L4, the amplitude VL and the amplitude VH of the vertical drive signal are each controlled so as to minimize the absolute value of the difference between the width of pulse train of the first detection signal and the width of pulse train of the second detection signal which are output from the first light sensor 291 and the second light sensor 292 of the light beam detector 29. Thus, the image projection apparatus 2 according to the second embodiment makes it possible for both of the position in the vertical direction of the lower edge 28*c* of the first display image 28*a* and the position in the vertical direction of the upper edge 28*d* of the second display image 28*b* to accord with the position in the vertical direction of the boundary line 293 between the first light sensor 291 and the second light sensor 292. Accordingly, the lower edge 28*c* of the first display image 28*a* and the upper edge 28*d* of the second display image 28*b* are aligned and joined with each other at the same position in the vertical direction, and thus a single image is formed. Therefore, the first display image 28*a* and the second display image 28*b* can be joined with each other, as if there is no seam, that is, so that no seam is distinguishable by the naked eye, and thus one large-sized high-quality image can be displayed.

Modification Example

In the first and second embodiments, the image projection apparatus that simultaneously scans two laser beams on the screen has been described. However, the present invention is also applicable to an image projection apparatus that, by simultaneously scanning three or more laser beams on a screen, displays one combined image including three or more display images arranged side by side in the horizontal direction, or one combined image including three or more display images arranged side by side in the vertical direction, or one combined image including four or more display images arranged side by side in the vertical and horizontal directions in the shape of a matrix.

The present invention is also applicable to various types of devices having an image display function, such as a small-sized laser scan projector, a television, a personal computer, and a display unit for indicating states of various types of devices used in a vehicle, a vessel, a plane, plant equipment, and so on.

DESCRIPTION OF REFERENCE CHARACTERS

1, 2 image projection apparatus; 11, 21 MEMS mirror device (scan mirror unit); 11*n*, 21*n* perpendicular line of MEMS mirror device; 12, 22 display control unit; 13, 23 MEMS mirror control unit (scan mirror control unit); 14, 24 first light source unit; 15, 25 second light source unit; 16, 26 first laser driver; 17, 27 second laser driver; 18, 28 screen (image display screen); 18*a*, 28*a* first display image; 18*b*, 28b second display image; 19, 29 laser beam detector (light beam detector); 111, 211 resonance point detector; 112, 212 horizontal drive unit; 113, 213 vertical drive unit; 114, 214 scan mirror; 115, 215 horizontal-scan-use rotation center shaft (elastic beam); 116, 216 vertical-scan-use rotation center shaft (elastic beam); 121, 221 buffer memory; 122, 222 drawing controller; 123, 223 data converter; 124, 224 first laser modulation controller; 125, 225 second laser modulation controller; 131, 231 synchronization signal generator; 132, 232 servo circuit; 133, 233 horizontal drive signal generator; 134, 234 vertical drive signal generator; 135, 235 driver circuit; 141, 241 red laser; 142, 242 green laser; 143, 243 blue laser; 151, 251 red laser; 152, 252 green laser; 153, 253 blue laser; 144, 244 first combination optical system; 154, 254 second combination optical system; 191, 291 first light sensor; 192, 292 second light sensor; 1441, 2441 collimator lens; 1442, 2442 collimator lens; 1443, 2443 collimator lens; 1444, 2444 wavelength selective mirror; 1445, 2445 wavelength selective mirror; 1446, 2446 condenser lens; 1447, 2447 optical fiber (light path changing member); 1448, 2448 collimator lens; 1541, 2541 collimator lens; 1542, 2542 collimator lens; 1543, 2543 collimator lens; 1544, 2544 wavelength selective mirror; 1545, 2545 wavelength selective mirror; 1546, 2546 condenser lens; 1547, 2547 optical fiber (light path changing member); 1548, 2548 collimator lens; L1, L3 first laser beam; L2, L4 second laser beam.

What is claimed is:

1. An image projection apparatus comprising:
a first light source unit that emits a first light beam;
a second light source unit that emits a second light beam;
a display control unit that controls light emission periods of the first light beam to and the second light beam;
a scan mirror unit that scans the first light beam and the second light beam to form a first display image formed by the first light beam and a second display image formed by the second light beam so as to be arranged side by side;
a light beam detector including a first light sensor and a second light sensor, the first light sensor and the second light sensor being arranged so that a boundary line between a first light reception surface of the first light sensor and a second light reception surface of the second light sensor is parallel with a line-shaped seam between the first display image and the second display image; and
a scan mirror control unit that adjusts a position of the first display image and a position of the second display image so as to minimize an absolute value of a difference between a time width of a detection signal output from the first light sensor and a time width of a detection signal output from the second light sensor;
wherein,
when the first light reception surface and the second light reception surface are irradiated with the first light beam, a width of an area irradiated with the first light beam is not more than a width which is a sum of a width of the first light reception surface and a width of the second light reception surface,
when the first light reception surface and the second light reception surface are irradiated with the second light beam, a width of an area irradiated with the second light beam is not more than the width which is the sum of the width of the first light reception surface and the width of the second light reception surface.

2. The image projection apparatus according to claim 1, wherein the scan mirror unit is a MEMS mirror device.

3. The image projection apparatus according to claim 1, wherein the first light sensor and the second light sensor output detection signals corresponding to incident light by performing photoelectric conversion.

4. The image projection apparatus according to claim 1, wherein each of the first display image and the second display image is a quadrangle of same shape.

5. The image projection apparatus according to claim 1, wherein
when scanning is performed with the first light beam on the light beam detector, the display control unit makes a light emission period of the first light beam on a side of the first display image and a light emission period of the first light beam on a side of the second display image equal, with reference to a first position at an edge of the first display image on a side of the second display image,
when scanning is performed with the second light beam on the light beam detector, the display control unit makes a light emission period of the second light beam on a side of the first display image and a light emission period of the second light beam on a side of the second display image equal, with reference to a second position at an edge of the second display image on a side of the first display image.

6. The image projection apparatus according to claim 1, wherein the first display image and the second display image are formed so as to be arranged side by side in a direction in which the first light beam and the second light beam are scanned.

7. The image projection apparatus according to claim 1, wherein an edge of the first display image on a side of the second display image and an edge of the second display image on a side of the first display image are shaped like straight lines perpendicular to a direction in which the first light beam and the second light beam are scanned.

8. The image projection apparatus according to claim 7, wherein the scan mirror control unit supplies a horizontal drive signal having a waveform of a square wave shape to the scan mirror unit, and adjusts a position in a horizontal scan direction of the first display image and a position in the horizontal scan direction of the second display image by changing an amplitude of the horizontal drive signal.

9. The image projection apparatus according to claim 1, wherein the first display image and the second display image are formed so as to be arranged side by side in a direction perpendicular to a direction in which the first light beam and the second light beam are scanned.

10. The image projection apparatus according to claim 1, wherein an edge of the first display image on a side of the second display image and an edge of the second display image on a side of the first display image are shaped like straight lines parallel with a direction in which the first light beam and the second light beam are scanned.

11. The image projection apparatus according to claim 10, wherein the scan mirror control unit supplies a vertical drive signal having a sawtooth waveform to the scan mirror unit, and adjusts a position in a vertical scan direction of the first display image and a position in the vertical scan direction of the second display image by changing an amplitude of the vertical drive signal.

12. An image projection apparatus comprising:
a first light source unit that emits a first light beam;
a second light source unit that emits a second light beam;
a display control unit that controls light emission periods of the first light beam and the second light beam;

a scan mirror unit that scans the first light beam and the second light beam to form a first display image formed by the first light beam and a second display image formed by the second light beam so as to be arranged side by side;

a light beam detector including a first light sensor and a second light sensor, the first light sensor and the second light sensor being arranged so that a boundary line between a first light reception surface of the first light sensor and a second light reception surface of the second light sensor is parallel with a line-shaped seam between the first display image and the second display image; and a scan mirror control unit that adjusts a position of the first display image and a position of the second display image so as to minimize an absolute value of a difference between a time width of a detection signal output from the first light sensor and a time width of a detection signal output from the second light sensor; wherein a first position at an edge of the first display image on a side of the second display image accords with a position of the boundary line, in a case where the time width of the detection signal output from the first light sensor and the time width of the detection signal output from the second light sensor are equal to each other, the first position is positioned on a side of the first light sensor from the position of the boundary line, in a case where the time width of the detection signal output from the first light sensor is larger than the time width of the detection signal output from the second light sensor, the first position is positioned on a side of the second light sensor from the position of the boundary line, in a case where the time width of the detection signal output from the first light sensor is smaller than the time width of the detection signal output from the second light sensor, a second position at an edge of the second display image on a side of the first display image accords with the position of the boundary line, in a case where the time width of the detection signal output from the first light sensor and the time width of the detection signal output from the second light sensor are equal to each other, the second position is positioned on a side of the first light sensor from the position of the boundary line, in a case where the time width of the detection signal output from the first light sensor is larger than the time width of the detection signal output from the second light sensor, and the second position is positioned on a side of the second light sensor from the position of the boundary line, in a case where the time width of the detection signal output from the first light sensor is smaller than the time width of the detection signal output from the second light sensor.

* * * * *